US011727065B2

(12) United States Patent
Jain et al.

(10) Patent No.: US 11,727,065 B2
(45) Date of Patent: Aug. 15, 2023

(54) BOOKMARK CONSERVATION SERVICE FOR DATA OBJECTS OR VISUALIZATIONS

(71) Applicant: SAP SE, Walldorf (DE)

(72) Inventors: Nikita Jain, Bangalore (IN); Devashish Biswas, Haridwar (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/207,459

(22) Filed: Mar. 19, 2021

(65) Prior Publication Data

US 2022/0300562 A1  Sep. 22, 2022

(51) Int. Cl.
*G06F 16/93* (2019.01)
*G06F 40/134* (2020.01)
*G06F 40/166* (2020.01)
*H04L 67/10* (2022.01)

(52) U.S. Cl.
CPC .......... *G06F 16/93* (2019.01); *G06F 40/134* (2020.01); *G06F 40/166* (2020.01); *H04L 67/10* (2013.01)

(58) Field of Classification Search
CPC .... G06F 40/169; G06F 16/93; G06F 16/9562; G06F 40/197; G06F 40/134; G06F 40/166; H04L 67/10
See application file for complete search history.

(56) References Cited

U.S. PATENT DOCUMENTS

| | | | | |
|---|---|---|---|---|
| 7,254,593 B2 * | 8/2007 | Albornoz | ............. | G06F 16/907 |
| | | | | 715/230 |
| 7,865,815 B2 * | 1/2011 | Albornoz | ............. | G06F 3/0483 |
| | | | | 715/229 |
| 8,201,079 B2 * | 6/2012 | Cragun | ................ | G06F 40/169 |
| | | | | 715/230 |
| 8,752,015 B2 * | 6/2014 | Basak | ................ | G06F 9/44505 |
| | | | | 717/121 |
| 9,135,312 B2 * | 9/2015 | Greenspan | .......... | G06F 16/2474 |
| 9,275,368 B1 * | 3/2016 | Harpalani | ............. | G06Q 10/10 |
| 9,311,193 B2 * | 4/2016 | Haustein | ............. | G06F 11/1453 |
| 9,454,285 B1 * | 9/2016 | Cai | ..................... | G06F 16/9566 |
| 9,588,986 B2 * | 3/2017 | Haustein | ............. | G06F 16/1873 |
| 10,503,822 B1 * | 12/2019 | Spencer | ............... | G06F 40/197 |
| 10,635,744 B2 * | 4/2020 | Beth | ..................... | G06F 16/282 |
| 10,803,239 B2 * | 10/2020 | Rychlewski | .......... | G06F 40/169 |
| 10,970,457 B2 * | 4/2021 | Prakash | ................ | G06F 40/143 |
| 11,074,401 B2 * | 7/2021 | Gatter | ..................... | G06F 40/12 |

(Continued)

OTHER PUBLICATIONS

Extended European Search Report for EP Application # 21213482.9, dated May 24, 2022, 11 pages.

*Primary Examiner* — Benjamin Smith
(74) *Attorney, Agent, or Firm* — Fountainhead Law Group P.C.

(57) ABSTRACT

The present disclosure provides systems and methods for retaining bookmarks of a first document when a second document is saved using the first name of the first document. Upon receiving a request to save the second document using the first name, it is determined whether another document is saved using that particular name. If such a document exists, properties of bookmarks associated with the first document are compared to properties of the second document using a set of rules. If the set of rules are satisfied, indicating that the bookmarks are usable, then the second document is stored using the first name while retaining the bookmarks of the first document.

20 Claims, 11 Drawing Sheets

(56) References Cited

U.S. PATENT DOCUMENTS

| | | | | |
|---|---|---|---|---|
| 2005/0165852 | A1* | 7/2005 | Albornoz | G06F 16/907 |
| 2005/0216526 | A1* | 9/2005 | Kumagai | G06F 16/9562 |
| 2006/0143558 | A1* | 6/2006 | Albornoz | G06F 40/197 |
| | | | | 715/205 |
| 2007/0192359 | A1* | 8/2007 | Steeb | G06F 16/93 |
| 2009/0100023 | A1* | 4/2009 | Inoue | G06F 40/169 |
| 2010/0094810 | A1* | 4/2010 | Ishibashi | G06F 16/93 |
| | | | | 707/662 |
| 2010/0251135 | A1* | 9/2010 | Jain | G01V 11/00 |
| | | | | 715/745 |
| 2011/0296291 | A1* | 12/2011 | Melkinov | G06F 40/131 |
| | | | | 715/229 |
| 2013/0145349 | A1* | 6/2013 | Basak | G06F 11/323 |
| | | | | 717/121 |
| 2013/0326324 | A1* | 12/2013 | Kamata | G06F 40/197 |
| | | | | 715/229 |
| 2014/0115436 | A1* | 4/2014 | Beaver | G06F 40/197 |
| | | | | 715/229 |
| 2015/0199411 | A1* | 7/2015 | Greenspan | G06F 16/93 |
| | | | | 715/229 |
| 2016/0196262 | A1* | 7/2016 | Haustein | G06F 16/162 |
| | | | | 707/638 |
| 2017/0083629 | A1* | 3/2017 | Cai | H04L 67/00 |
| 2017/0116188 | A1* | 4/2017 | Haustein | G06F 11/1453 |
| 2017/0178266 | A1* | 6/2017 | Schmidt | G06F 40/134 |
| 2017/0200122 | A1* | 7/2017 | Edson | H04L 63/104 |
| 2017/0308511 | A1* | 10/2017 | Beth | G06F 40/169 |
| 2019/0155870 | A1* | 5/2019 | Prakash | G06F 40/103 |
| 2020/0097535 | A1* | 3/2020 | Rychlewski | G06F 40/186 |
| 2020/0401762 | A1* | 12/2020 | Rychlewski | G06F 40/169 |
| 2021/0124798 | A1* | 4/2021 | Gatter | G06F 8/71 |
| 2022/0036311 | A1* | 2/2022 | Didrickson | G06Q 10/101 |

* cited by examiner

BOOKMARK CONSERVATION SERVICE FOR DATA OBJECTS OR VISUALIZATIONS

BACKGROUND

The present disclosure pertains to storage of documents and in particular to storing documents associated with bookmarks.

Software applications can be used to visualize and analyze large sets of data. Such applications may present the data in documents, such as spreadsheets or graphical documents including visualizations (e.g., tables, graphs, and charts) of the data. The data presented in such documents may be obtained by querying one or more live data sources. The documents may be hosted by a "cloud" or "on-premise" computer system platform such that they may be accessed by a plurality of users.

Documents may be associated with bookmarks that define particular queries such that users can switch between different views or different filters on the data to be visualized. In some cases, these bookmarks may be accessible to a plurality of the users of the document. In some situations, a user may desire to change an existing document to present new data or to modify the presentation of existing data. To avoid interruption of the other users that access that document, the user may create a copy of the existing document (e.g., using "save as" functionality). After modifying the copy of the document, the user may save the modified document as the existing document (e.g., using the name or file path of the original document). However, if the document platform uses unique bookmark identifiers to associate a document with its particular set of bookmarks, the existing bookmarks of the original document may be lost (e.g., no longer accessible) when the modified document is saved using the name of the original document. This situation is problematic as the users may need to recreate their bookmarks.

There is a need for improved systems and methods for storing documents associated with bookmarks. The present disclosure addresses these issues and others, as further described below.

SUMMARY

One embodiment provides a computer system comprising one or more processors and one or more machine-readable medium. The one or more machine-readable medium are coupled to the one or more processors. The one or more machine-readable medium store computer program code comprising sets of instructions executable by the one or more processors. The instructions are executable by the one or more processors to store a first document data object using a first name. The first document data object includes a first bookmark identifier associated with a first set of bookmark data objects. Each bookmark data object of the first set includes a set of properties and corresponding property values. The instructions are further executable by the one or more processors to obtain a request from a first client computer to store a second document data object using a requested name. The requested name being the same as the first name of the first document data object. The instructions are further executable by the one or more processors to determine, in response to the request, whether a stored document data object is stored using the requested name. The first document being stored using the requested name. The instructions are further executable by the one or more processors to determine, in response to the determination that the first document is stored using the requested name, whether to include the first bookmark identifier associated with the first set of bookmark data objects in the second document data object based on a set of rules identifying one or more properties of document data objects. The instructions are further executable by the one or more processors to store a modified second document data object including the first bookmark identifier based on the set of properties and corresponding property values of the first set of bookmark data objects and second properties and corresponding second property values of the second document data object satisfying the set of rules.

Another embodiment provides one or more non-transitory computer-readable medium storing computer program code comprising sets of instructions. The computer program code comprises instructions to store a first document data object using a first name. The first document data object including a first bookmark identifier associated with a first set of bookmark data objects. Each bookmark data object of the first set including a set of properties and corresponding property values. The computer program code further comprises instructions to obtain a request from a first client computer to store a second document data object using a requested name, the requested name being the same as the first name of the first document data object. The computer program code further comprises instructions to determine, in response to the request, whether a stored document data object is stored using the requested name, the first document being stored using the requested name. The computer program code further comprises instructions to determine, in response to the determination that the first document is stored using the requested name, whether to include the first bookmark identifier associated with the first set of bookmark data objects in the second document data object based on a set of rules identifying one or more properties of document data objects. The computer program code further comprises instructions to store a modified second document data object including the first bookmark identifier based on the set of properties and corresponding property values of the first set of bookmark data objects and second properties and corresponding second property values of the second document data object satisfying the set of rules.

Another embodiment provides a computer-implemented method. The computer-implemented method includes storing a first document data object using a first name. The first document data object includes a first bookmark identifier associated with a first set of bookmark data objects. Each bookmark data object of the first set including a set of properties and corresponding property values. The method further includes obtaining a request from a first client computer to store a second document data object using a requested name, the requested name being the same as the first name of the first document data object. The method further includes determining, in response to the request, whether a stored document data object is stored using the requested name, the first document being stored using the requested name. The method further includes determining, in response to the determination that the first document is stored using the requested name, whether to include the first bookmark identifier associated with the first set of bookmark data objects in the second document data object based on a set of rules identifying one or more properties of document data objects. The method further includes storing a modified second document data object including the first bookmark identifier based on the set of properties and corresponding property values of the first set of bookmark data objects and second properties and corresponding second property values of the second document data object satisfying the set of rules.

The following detailed description and accompanying drawings provide a better understanding of the nature and advantages of the present disclosure.

DETAILED DESCRIPTION

Figure 1:
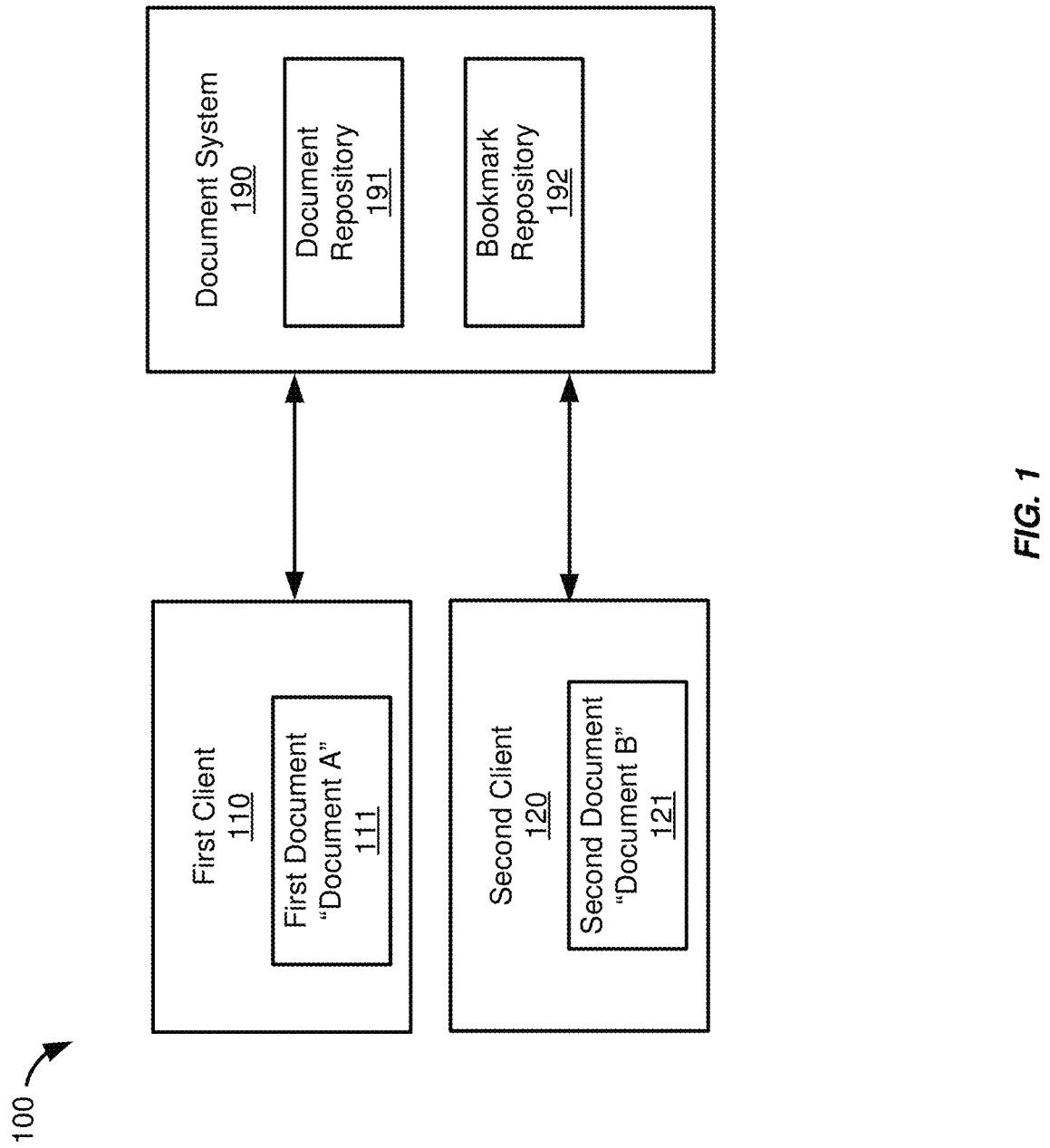
FIG. 1 shows a diagram of client computers systems in communication with a document system, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. Furthermore, the terms "first," "second," "third," "fourth," etc., used herein do not necessarily indicate an ordering or sequence unless indicated. These terms may merely be used for differentiation between different objects or elements without specifying an order.

As mentioned above, documents (e.g., provided by a cloud or on-premise platform) may include bookmarks that are associated with particular queries such that users can switch between different views or different filters on the data. These bookmarks may be accessible to all users of the document. In some situations, for example, a user may desire to change an existing document to present a new data source or to modify the presentation of existing data sources. To avoid interruption of the other users who access that document, the user may create a copy of the existing document. After modifying the copy of the document, the user may save the modified document as the existing document. However, if the document platform stores documents using unique bookmark identifiers, the existing bookmarks of the original document may be lost when the modified document is saved using the name of the existing document. This situation is problematic as the users may need to recreate their bookmarks. This problem may arise in other similar situations as well.

The present disclosure provides systems and methods for retaining bookmarks of a first document when a second document is saved as the first document (e.g., using the name or file path of the first document). Upon receiving a request to save the second document using the first name, it is determined whether another document is saved using that particular name. If such a document exists, properties of bookmarks associated with the first document are compared to properties of the second document using a set of rules. If the set of rules are satisfied, indicating that the bookmarks are still usable, then the second document is stored using the first name while retaining the bookmarks of the first document.

Use of this bookmark conservation technique enables the bookmarks of the first document to be retained if the bookmarks are still usable with the second document (e.g., the modified document) while the bookmarks are not retained if they are not usable. This allows a user to copy an original document, modify the copy of the document, and then save the modified document as the original document (e.g., using the name of the original document) without disrupting other users access of the document or their use of the bookmarks in that document, and while still retaining the bookmarks used by the users. The problem of lost bookmarks caused by saving a document with a preexisting name and the solution provided by the bookmark conservation service are further described below.

Before further describing the bookmark conservation techniques, a document system providing documents including bookmarks is described below with respect to FIG. 1 and exemplary user interfaces for interacting with a document and its associated bookmarks are described below with respect to FIG. 2 and FIG. 3. The bookmark conservation techniques may be implemented in such a document system as further described below.

FIG. 1 shows a diagram 100 of client computers systems 110, 120 in communication with a document system 190, according to an embodiment. The first client computer 110 and the second client computer 120 may communicate with the document system 190 over a network (e.g., an intranet or the Internet). The client computers 110, 120 may be desktop computers, laptop computers, or mobile devices, for example. The document system 190 may include one or more server computers operating together as a system. The document system 190 may be a cloud-based platform or an on-premise platform hosting documents for access by the first client computer 110 and the second client computer 120, as well as other client computers. The document system 190 may include a document repository 191 storing documents that may be provided to the users. The documents stored in the document repository 191 may use associated bookmarks stored in bookmark repository 192. The documents may include a unique bookmark identifier that is associated with a particular set of bookmarks in the bookmark repository. The client computers 110, 120 may be used by end-users to open documents based on queries of a database, such as a data warehouse, of the document system 190. The end-users may use the bookmarks to configure the document to use certain queries or to set the format or presentation of the document.

The document system 190 may provide documents that include a unique bookmark identifier associated with a particular set of bookmarks. For example, a bookmark technical component may be embedded in a document and the bookmark technical component may include the unique bookmark identifier. The unique bookmark identifier may identify the set of bookmarks that are associated with the document. That is, the bookmark identifier may establish a relation between the document and a list of bookmarks supported for the document (e.g., the "2Cities" bookmark and the "4Cities" bookmarks in FIGS. 2 and 3 discussed below). During the viewing or opening of the document, this bookmark identifier may be used to pull the bookmarks associated with the bookmark identifier from the bookmark repository 192.

Figure 2:
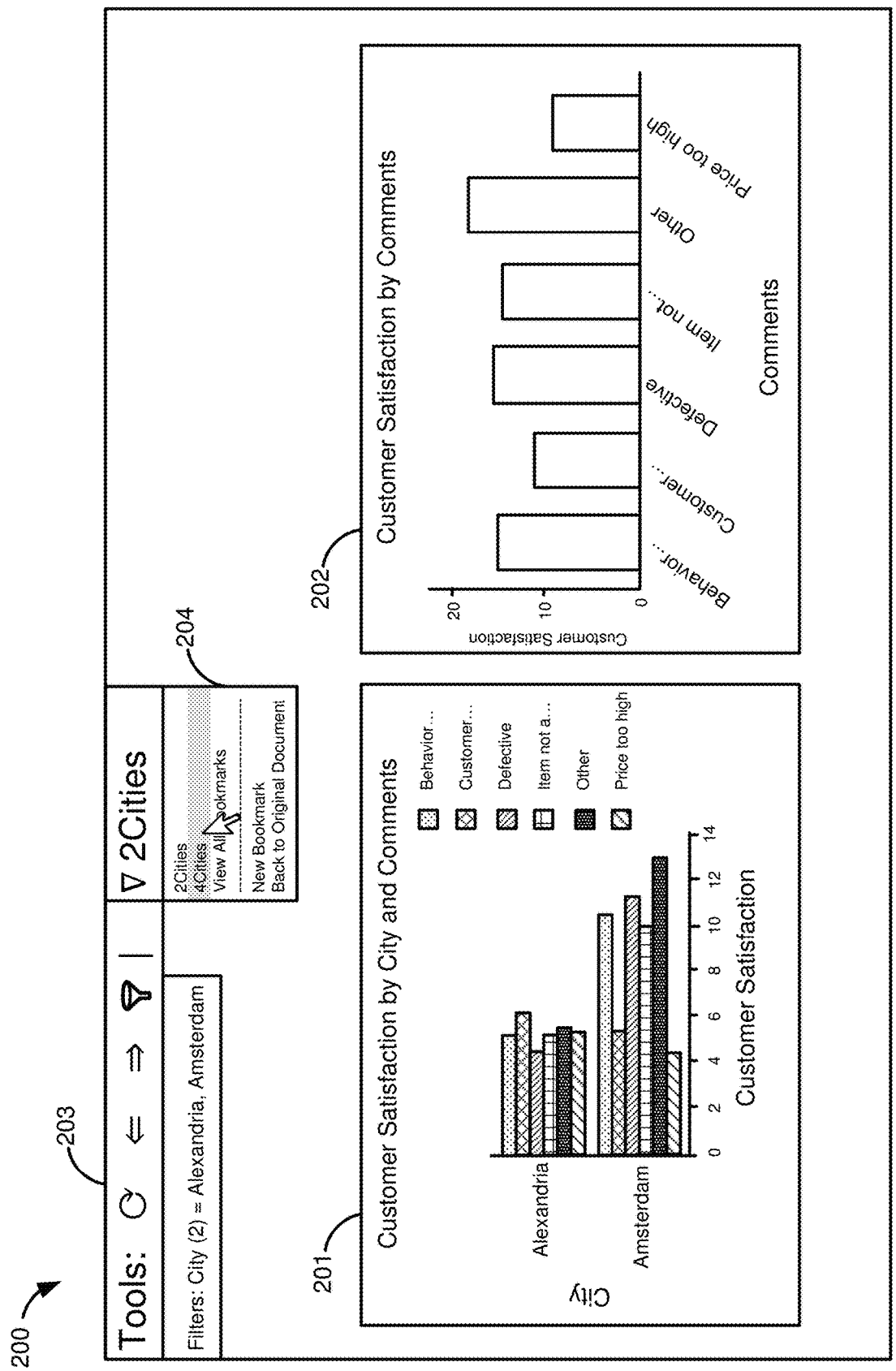
FIG. 2 illustrates a user interface of a client accessing a document implementing bookmarks, according to an embodiment.

FIG. 2 illustrates a user interface 200 of a client accessing a document implementing bookmarks, according to an embodiment. The user interface 200 includes a first visualization 201 showing a bar graph of customer satisfaction by city and comments. The first visualization shows data for two cities, Alexandria and Amsterdam. The user interface 200 also includes a second visualization 202 showing a bar graph of customer satisfaction by comments for the same two cities, Alexandria and Amsterdam. These visualizations are generated by querying one or more data sources (e.g., data sources provided by a database of or accessible by the document system). The document may specify the query parameters for obtaining data for the visualizations and also configuration and settings information for presenting the visualizations. The document may be further configured to show various other data using other types of visualizations (not shown in FIG. 2).

The user interface also includes a menu bar 203 with tools for navigating the user interface. The menu bar 203 includes a bookmark menu 204 that may be used to access different bookmarks associated with the document. The bookmark menu 204 may also enable the user to view all bookmarks, create a new bookmark, or go back to the original document (e.g., to the default bookmark).

In this example, the user of the user interface 200 is currently viewing a bookmark named "2Cities." The "2Cities" bookmark includes the query parameters and configuration information needed to present the first visualization 201 and the second visualization 202 as shown in the user interface. The user may select the "4Cities" bookmark from the bookmark menu 204. The result of selecting the "4Cities" bookmark is shown in FIG. 3.

The visualizations shown in FIG. 2 are examples used to show the utility of bookmark functionality. In other embodiments, different queries of different data sources may be used and the data may be visualized in different ways.

Figure 3:
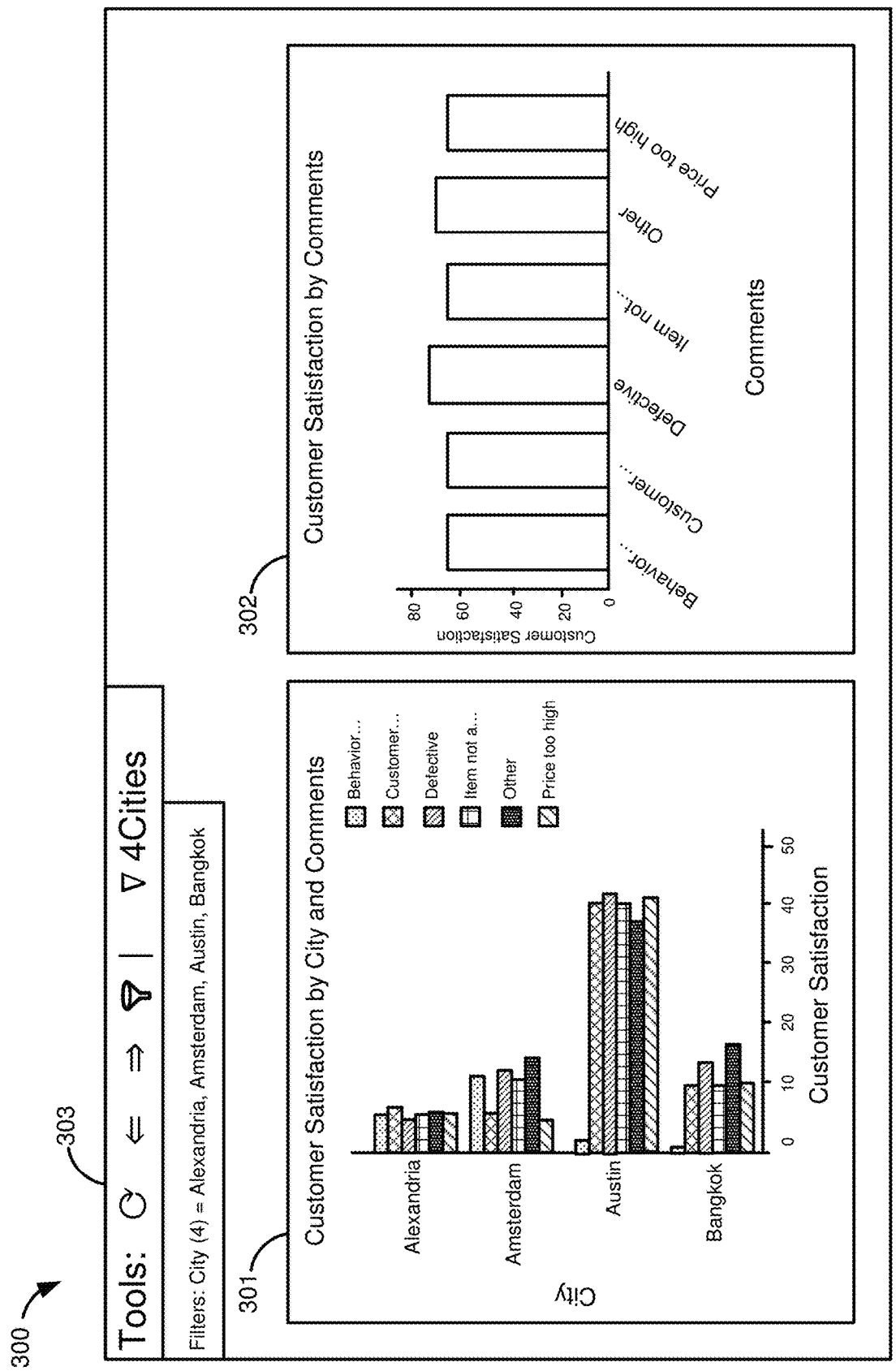
FIG. 3 illustrates the user interface of the client of FIG. 2 after selecting a bookmark, according to an embodiment of the invention.

FIG. 3 illustrates a user interface 300 of the client after selecting a bookmark, according to an embodiment of the invention. The user interface 300 shows visualizations of data associated with a bookmark named "4Cities." This user interface 300 may be presented in response to the user selecting the "4Cities" bookmark from the bookmark menu 204 of FIG. 2, for example. The user interface 300 includes a first visualization 301 showing a bar graph of customer satisfaction by city and comments. The first visualization shows data for four cities, Alexandria, Amsterdam, Austin, and Bangkok. The user interface 300 also includes a second visualization 302 showing a bar graph of customer satisfaction by comments for the same four cities, Alexandria, Amsterdam, Austin, and Bangkok.

Use of bookmarks is advantageous because it enables users to easily switch between different views of the data without manually configuring the data queries and filters used to obtain the underlying data and without setting the type and configuration of the visualization.

The visualizations shown in FIG. 3 are examples used to show the utility of bookmark functionality. In other embodiments, different queries of different data sources may be used and the data may be visualized in different ways.

As discussed above, if the platform provided by the document system stores documents using unique bookmark identifiers, the existing bookmarks of the existing document may be lost when the modified document is saved using the name of the existing document. For instance, saving a document using the same name as a preexisting document may overwrite the preexisting document using a different (e.g., new and unique) bookmark identifier such that the bookmarks for the preexisting document are lost. In this situation, the new document having the same name as the preexisting document may not have the bookmarks that the preexisting document had since the new document has a different unique bookmark identifier. For instance, the existing bookmarks are associated with the bookmark identifier of the existing document and may not be associated with the new bookmark identifier for the modified document.

One example circumstance in which this problem may occur is when several colleagues use the same document and they decide to modify the document to improve or change the visualizations of data in the document, or for any other reason. To avoid interruption of the other colleagues use of the document, a first colleague may use "save as" functionality to save the existing (first) document as a new (second) document having a different (second) name. The first colleague may then modify the second document without risk of ruining the first document. For instance, the second document may be modified to visualization data in a pie chart instead of a bar graph. The first colleague may then use the "save as" functionality to save the second document using a first name of the existing first document. However, this can be problematic in implementations of the document system that use unique bookmark identifiers for documents since the second document, when saved using the first name of the first document, may include a new unique bookmark identifier. The new unique bookmark identifier may not be associated with any bookmarks since it is new.

An exemplary workflow in which this problem occurs is given below:

1. Create a first document and save it as "DocA." 111. The first document includes a first unique bookmark identifier "Bid1" (e.g., generated when the document is created).

2. Create a first set of bookmarks on the first document (Bid1 is associated with a first set of bookmarks $A_1$, $A_2, \ldots A_n$).

3. Use "Save As" functionality to save the first document as "DocB," a second document 121. The second document includes a second unique bookmark identifier "Bid2" (e.g., generated when the document is created).

4. Perform modifications to the second document "DocB."

5. Use "Save As" functionality to save the second document (DocB) as a third document named "DocA," the name of the first document (overwriting the first document created in step 1). The third document includes a third unique bookmark identifier "Bid3."

In this example workflow, none of the bookmarks created in step 2 may be associated with "DocA" (even though they may exist in the repository). That is, the third bookmark identifier "Bid3" is not associated with the first set of bookmarks $A_1, A_2, \ldots A_n$.

This problem of lost bookmarks may be solved using the following bookmark conservation technique. When a document is requested to be saved (e.g., using "Save As" functionality) using a particular name (or file path), determine whether a document with that name (or file path) already exists. If such a document exists, execute a bookmark conservation service (e.g., a process or algorithm). The bookmark conservation service may use a set of rules to determine whether the bookmarks associated with the existing document are usable, based on a set of rules, with the documents requested to be saved. If the bookmarks are usable, then a bookmark identifier of the existing document may be included in the document being saved such that it will be associated with the bookmarks of the existing document (which is overwritten). If there is no existing document with the same name or if the existing document does not have any associated bookmarks, then the bookmark conservation service may not be executed.

For instance, bookmarks (i.e., bookmark data objects) may be associated with a bookmark technical component of the document that created it. The bookmark technical component includes a unique bookmark identifier. The bookmark technical component may be embedded in the document data object. For example, the document "Doc1" named "DocA" may be created having a bookmark component with a unique Bookmark Identifier "Bid1." In this case, all the bookmarks created for "DocA" may have the Bookmark Identifier as "Bid1." When the document "Doc1" is saved as "DocB," the Bookmark Identifier may be changed to "Bid2," a different unique identifier. If the document "Doc1" named "DocB" is saved back as "DocA," the bookmark identifier may be changed to "Bid3," a different unique identifier. The bookmark identifier may change to a different unique identifier each time that the document is saved as a different name because the document platform may be configured (as a software design decision) to use unique bookmark identifiers for each document.

Since the bookmarks for "Doc1" were originally created with "Bid1," the query to get the bookmarks for "Doc1" and "Bid3" may return a blank result set. Thus, all of the bookmarks that were associated with "DocA" have been lost (i.e., these bookmarks are not associated with the bookmark identifier of the document). To prevent these bookmarks from getting lost, before performing the "save as" operation, a Bookmark Prevention Service (algorithm) is run based on a set of rules. The outcome of the algorithm using the rules gives a decision of whether to retain the old "Doc1" bookmark identifier "Bid1" or to create a new one "Bid3." The old bookmark identifier may be included in the new "save as" document if the bookmarks are compatible (e.g., usable) with the document being saved based on the rules. If the bookmarks are not compatible, then they do not need to be retained and a different bookmark identifier (e.g., "Bid3") may be included in the document. The association between document objects and bookmark objects is further described below with respect to FIG. 8.

In some embodiments, the bookmark conservation service may use two separate rule files, which may be included with installation of the document platform. In some embodiments these rule files are XML documents. For example, defaultComponents.xml and customComponents-sample.xml. The defaultComponents.xml rule file contains rules for the default document platform while the customComponents.xml includes rules for custom components that have been created on the document platform for use by the client computers. For instance, a particular organization using the document platform may have specially created certain components for their own particular use cases. If a clustered environment is used for the document platform (instead of a single server) then every server node of the cluster may have these two rule files with the same directory structure.

The defaultComponents.xml rule file may contain a list of default components (e.g., shipped with the installer) and can be bookmarked along with its various properties that need to be compared between the source and the target documents. A simplified example of the default rule file is shown in Listing 1 below:

Listing 1

```
<components>
    <component type='QUERY_DATA_SOURCE'>
        <properties>
            <DATA_SOURCE_TYPE/>
            <DATA_SOURCE_NAME/>
            <DATA_SOURCE_IS_BLENDED/>
        </properties>
    </component>
     <component type='CROSSTAB_COMPONENT'>
        <properties>
            <DATA_SOURCE_ALIAS_REF/>
        </properties>
    </components
    </component type='com_ip_bi_VizFrame'>
        <properties>
            <DATA_SOURCE_ALIAS_REF/>
            <vizType/>
            <feedItems/>
        </properties>
    <component>
     <component type='com_ip_bi_Shape'>
        <properties>
            <shapeUrl/>
        </properties>
    </component>
    .......
    .......
</components>
```

The custom rule file (customComponents-sample.xml) for extensions deployed by a particular organization may contain a list of extension components that were installed and can be bookmarked along with its various properties that need to be compared between the source and the target documents. This sample rule file may be edited by the organization according to the configuration of their extensions. A simplified example of the custom rule file is shown in Listing 2 below:

Listing 2

```
<components>
  <!--Copy the below node and modify the entries-->
  <!--
  <component type='Add the type of the installed component'>
    <properties>
      <Add the property that needs to be compared/>
      <Add the property that needs to be compared/>
      .......
    </properties>
  </component>
  -->
<components>
```

These rule files may be used to determine whether the bookmarks of the target document to be overwritten are compatible with the source document being saved as further described below. If the bookmarks are compatible, they may be retained for use with the source document. The bookmark conservation service is advantageous because users of the document may not have to recreate the bookmarks as they would if the bookmarks were lost during the "Save As" operation.

Figure 4:
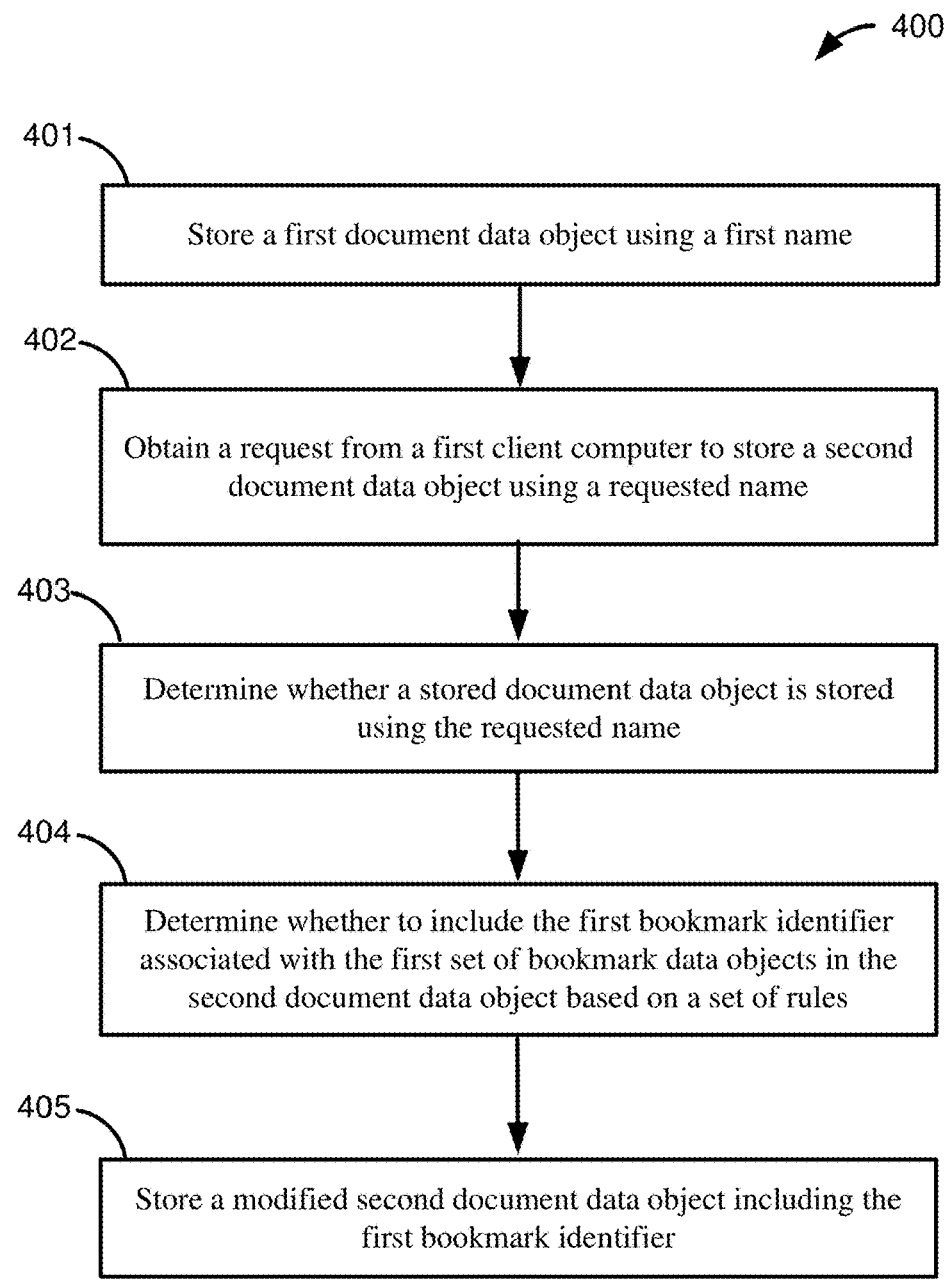
FIG. 4 shows a flowchart of a computer-implemented method, according to an embodiment.

FIG. 4 shows a flowchart 400 of a computer-implemented method, according to an embodiment. The method applies the bookmark conservation techniques described herein. The method may be implemented by a document server such as the document system (e.g., document system 190). The document system may include one or more server computers operating together as a system. The document system may be a cloud-based platform or an on-premise platform hosting documents for access by a plurality of client computers.

At 401, the method stores a first document data object using a first name. The document may present data formatted as spreadsheets or as graphical documents including visualizations (e.g., tables, graphs, and charts). The document may include data obtained from one or more live data sources. The data for the document may be obtained by querying the data sources. The documents may be hosted by a cloud platform or on-premise platform such that they may be accessed by a plurality of users.

The first document data object includes a first bookmark identifier associated with a first set of bookmark data objects. Each bookmark data object of the first set including a set of properties and corresponding property values. The set of properties and the corresponding property values may indicate a particular set of data to be visualized in the first document and configurations for visualizing the particular sets of data. For instance, the properties may indicate one or more queries for retrieving data to be visualized.

At 402, the method obtains a request from a first client computer to store a second document data object using a requested name. The first client computer may send the request over a network. For instance, the request may be a request to publish the document to the document server such that other client computers may access the document. The client computer may be desktop computers, laptop computers, or mobile devices, for example.

At 403, the method determines whether a stored document data object is stored using the requested name. Each document may include a unique bookmark identifier different from the bookmark identifiers of other documents. However, users may desire to have bookmarks be retained when one document is saved using the same name as an existing document. Therefore, the method determines whether there is such an existing document. In some embodiments, the requested name being the same as the first name of the first document data object and the first document is stored using the requested name.

At 404, the method determines whether to include the first bookmark identifier, which is associated with the first set of bookmark data objects, in the second document data object based on a set of rules. The set of rules may indicate whether the bookmarks are usable with the second document. This determination may be made in response to the determination that the first document is stored using the requested name. In some embodiments, the determination of whether to include the first bookmark identifier is based on a comparison of the set of properties and corresponding property values of the first set of bookmark data objects and second properties and corresponding second property values of the second document data object. In some embodiments, the set of rules is further based on properties of custom components created for the first client computer.

At 405, the method stores a modified second document data object including the first bookmark identifier. The second document data object may include the first bookmark identifier based on the set of properties and corresponding property values of the first set of bookmark data objects and second properties and corresponding second property values of the second document data object satisfying the set of rules.

In some embodiments, the method may provide the modified second document data object including the first bookmark identifier to a second client computer. The modified second document data object includes parameters for one or more queries to obtain data for one or more visualizations of the data. The first set of bookmark data objects may be usable by the second client computer to change visualizations of the modified second document data object.

In some embodiments, the method may additionally obtain a second request from a second client computer to store a third document data object using a second requested name. The second requested name being the same as a fourth name of a fourth document data object stored using the fourth name. The fourth document data object including a fourth bookmark identifier. In such embodiments, the method may store the third document data object including a third bookmark identifier based on the a fourth set of properties and corresponding fourth property values of a fourth set of bookmark data objects associated with the fourth bookmark identifier and the third properties and corresponding third property values of the third document data object not satisfying a second set of rules.

Features and advantages of the method include retaining the first set of bookmark data objects for a document when that document is overwritten by a second document using "Save As" functionality in cases where the bookmarks are usable with the second document according to the set of rules.

Figure 5:
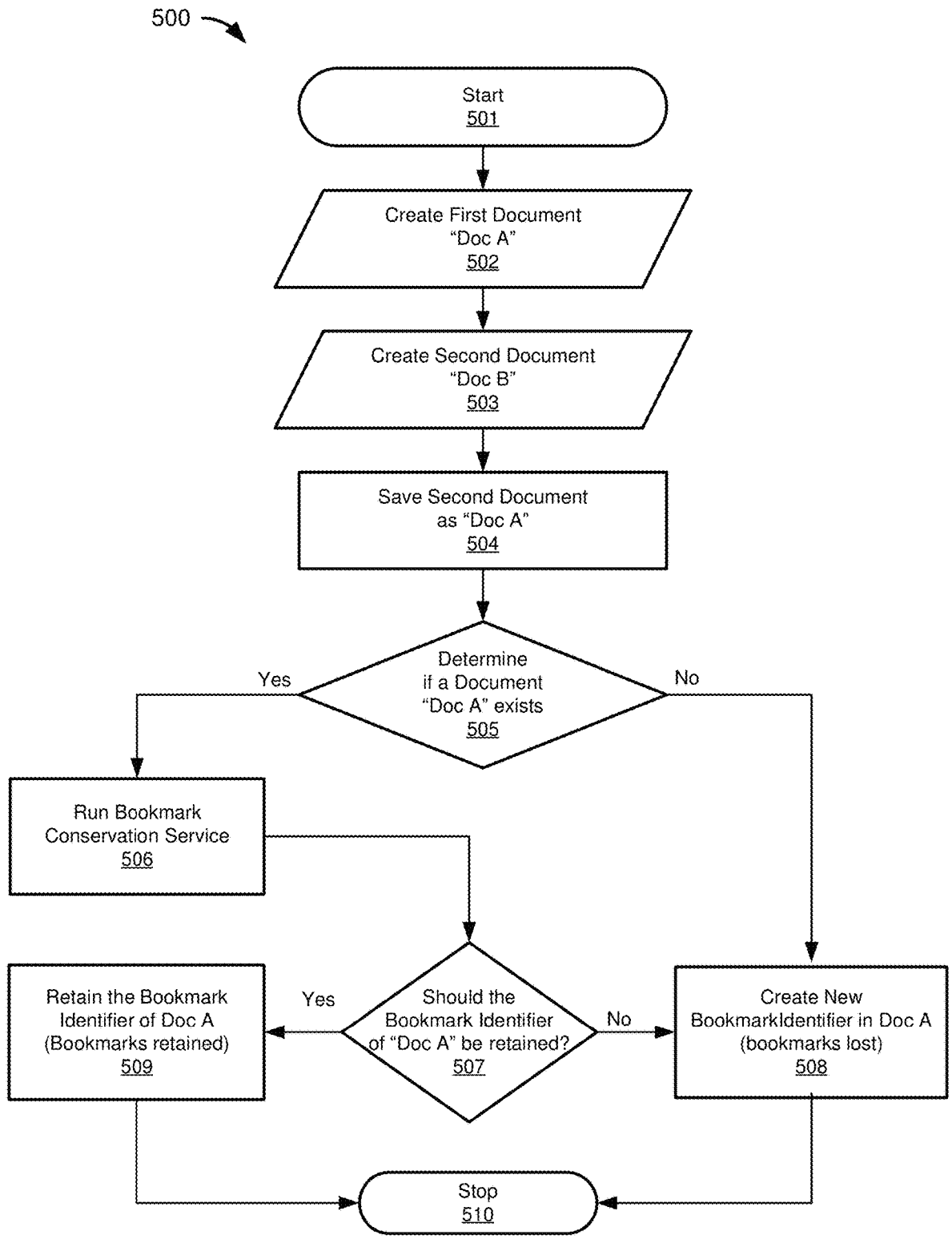
FIG. 5 shows a flow chart of an example workflow implementing bookmark conservation techniques, according to an embodiment.

FIG. 5 shows a flow chart 500 of an example workflow implementing bookmark conservation techniques, according to an embodiment. This workflow may be implemented by a document server such as the document system (e.g., document system 190). The document system may include one or more server computers operating together as a system. The document system may be a cloud-based platform or an "on-premise" platform hosting documents for access by a plurality of client computers.

The workflow starts at 501 by creating a first document named "Doc A," at 502. Then the workflow creates a second document named "Doc B" at 503. The second document "Doc B" is then saved as "Doc A" at 504. In one example, "Doc B" may be a copy of "Doc A" that has been modified and is now overwriting the original "Doc A."

Figure 6:
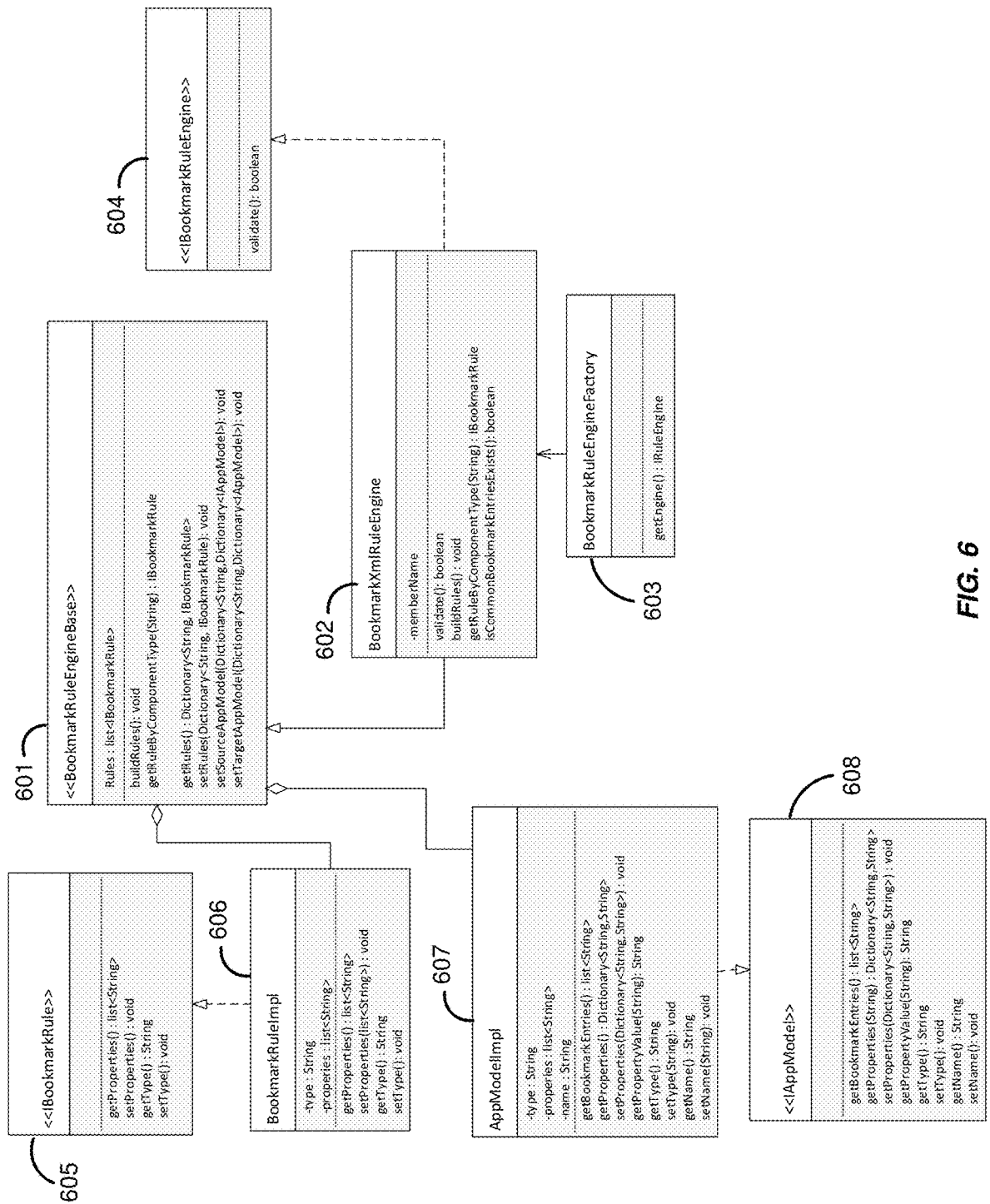
FIG. 6 shows a class diagram of an exemplary bookmark conservation service, according to an embodiment.
Figure 7A:
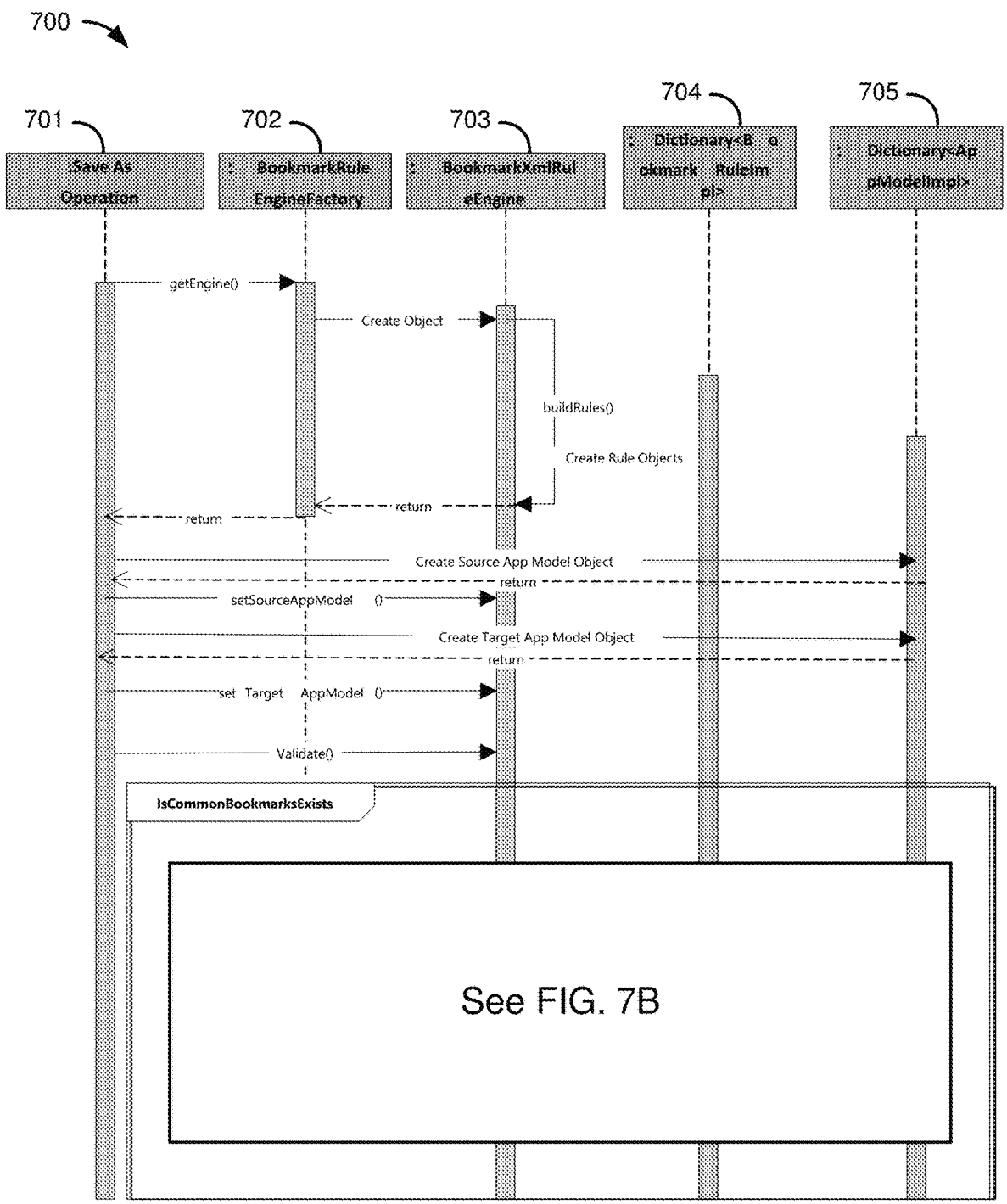
FIG. 7A and 7B show a sequence diagram of an exemplary bookmark conservation service, according to an embodiment.
Figure 7B:
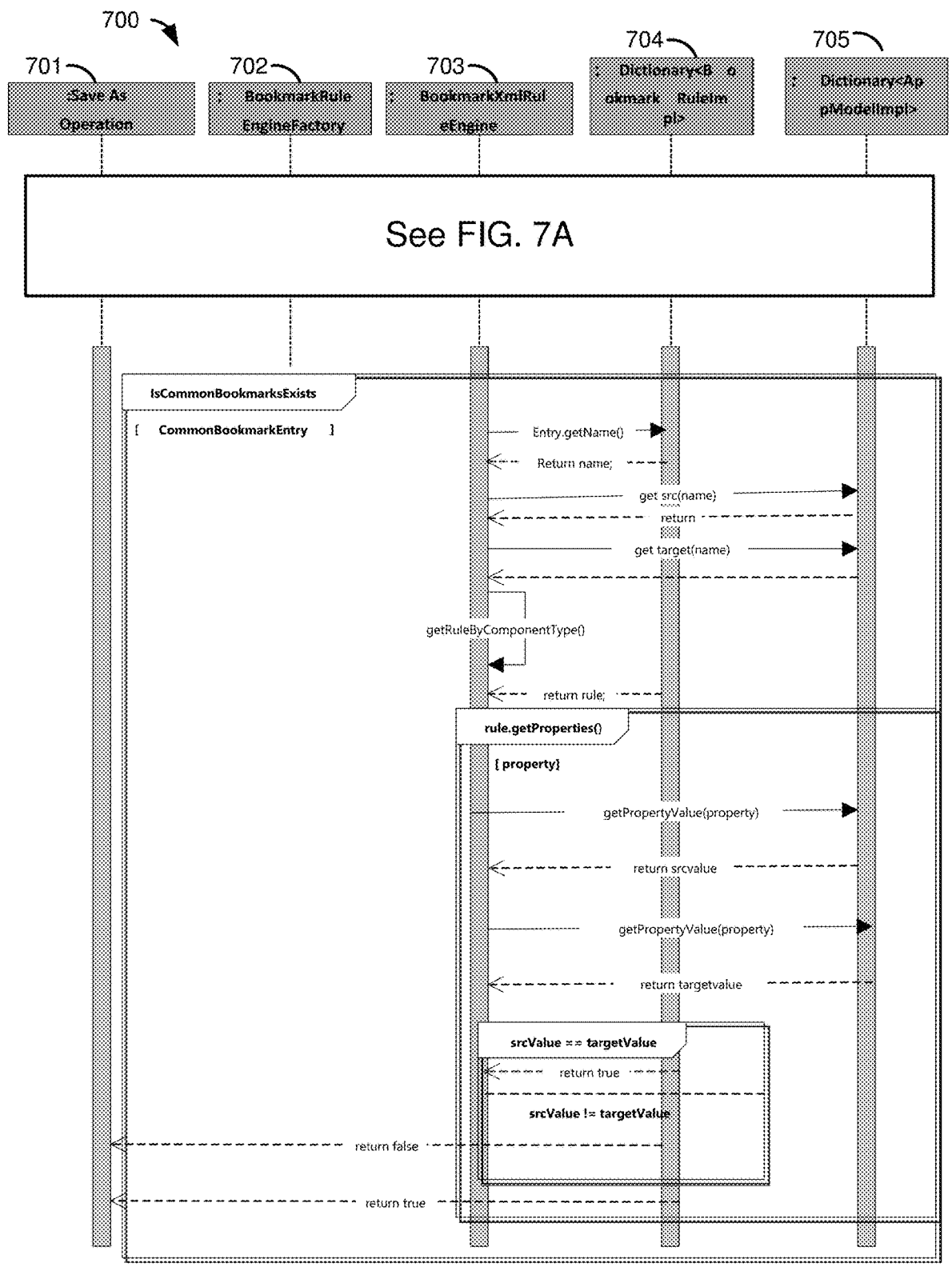

At 505, the workflow determines if "Doc A" exists. If "Doc A" does not exist (decision: No) then the workflow continues to create a new Bookmark Identifier in "Doc A" at 508 such that the bookmarks associated with the old Bookmark Identifiers in the original "Doc A" are lost. If the document "Doc A" does exist (decision: Yes) at 505, then the workflow continues to run the bookmark conservation service 506. An example class diagram of the bookmark conservation service is shown in FIG. 6 and an exemplary sequence diagram of operating the bookmark conservation service is shown in FIG. 7A and 7B.

By running the bookmark conservation services it can be determined at 507 whether the bookmark identifier of "Doc A" should be retained or not. This determination may be based on a set of rules that indicate whether the bookmark identifier of "Doc A" is associated with bookmarks that are usable with the second document. If the decision at 507 is "No," then the workflow continues to create a new Bookmark Identifier in "Doc A" at 508 such that the bookmarks associated with the old Bookmark Identifiers in the original "Doc A" are lost and the workflow stops at 510.

If the decision at 507 is "Yes," then the workflow will retain, at 509, the bookmark identifier of "Doc A" such that the bookmarks associated with that bookmark identifier may be used with the second document. Then the workflow stops at 510.

The bookmark conservation service may be implemented by software executed by the document system. FIG. 6 shows a class diagram of an exemplary bookmark conservation service, according to an embodiment. The bookmark conservation service includes a "BookmarkRuleEngineBase" class 601, a "BookmarkXmlRuleEngine" class 602, a "BookmarkRuleEngineFactory" class 603, an "IBookmarkRuleEngine" class 604, and "IBookMarkRule" class 605, a "BookmarkRuleImpl" class 606, an "AppModelImpl" class 607, and an "IAppModel" class 608.

The BookmarkRuleEngineFactory class 603 includes a getEngine( ) operation that returns a Rule Engine and it depends on the BookmarkXmlRuleEngine class 602.

The BookmarkXmlRuleEngine class 602 inherits from the BookmarkRuleEngineBase class 601 and the BookmarkRuleEngineFactory class 603. The BookmarkXmlRuleEngine class 602 includes validate( ) buildRules( ) getRuleByComponentType( ) and isCommonBookmarkEntriesExist( ) operations.

The BookmarkRuleEngineBase class 601 includes a list of Rules and includes buildRules( ) getRuleByComponentType( ) getRules( ) setRules( ) setSourceAppModel( ) and setTargetAppModel( ) operations.

The BookmarkRuleImpl class 606 is a part of (i.e., aggregation relationship) the BookmarkRuleEngineBase class 601 and it inherits from the IBookMarkRule class 605. The BookmarkRuleImpl class 606 includes a type, a list of properties, and the getProperties( ) setProperties( ) getType( ) and setType( ) operations.

The AppModelImpl class 607 is a part of (i.e., aggregation relationship) the BookmarkRuleEngineBase class 601 and it depends on the IAppModel class 608. The AppModelImpl class 607 includes a type, a list of properties, a name, and getBookmarkEntries( ) getProperties( ) setProperties( ) getPropertyValue( ) getType( ) setType( ) getName( ) and setName( ) operations.

These classes are further described below with respect to FIG. 7.

FIG. 7 shows a sequence diagram 700 of an exemplary bookmark conservation service, according to an embodiment. As discussed above, the bookmark conservation service may be run when one document is being saved as another document. The document being saved may be referred to as the "source" and the document that is to be overwritten may be referred to at the "target." The phrase "App" or "Application" refers to document as the document may include one or more "Apps" or "Applications."

The sequence diagram depicts the functions of a Save As Operation 701, a BookmarkRuleEngineFactory class 702, a BookmarkXmlRuleEngine class 703, a Dictionary<BookmarkRuleImpl> class 704, and a Dictionary<AppModelImpl> class 705, which are shown in FIG. 6 above.

Bookmark conservation techniques includes building a rule engine and obtaining the rules. For instance, the Save As Operation 701 calls the getEngine( ) operation of the BookmarkRuleEngineFactory 702. The BookmarkRuleEngineFactory 702 creates the RuleEngine object and performs the buildRules( ) operation to build the rules, which are a list of BookmarkRule objects. The rules objects are returned to the BookmarkRuleEngineFactory 702 and then to the Save As Operation 701. An example of the rules is shown in Listing 1 above.

Bookmark conservation techniques further include obtaining a model object of the source document and the target document. For instance, the Save As Operation 701 then sends a request to Create Source App Model Object to Dictionary<AppModelImpl> 705, which returns the source document model object. Then the Save As Operation 701 calls the SetSourceAppModel( ) operation of the BookmarkXmlRuleEngine 703 to set the source document. Save As Operation 701 then sends a request to Create Target App Model Object to the Dictionary<AppModelImpl> 705, which returns the target document model object. The Save As Operation 701 then calls the setTargetAppModel( ) operation of the BookmarkXmlRuleEngine 703. Further description and examples of the information in the source and target objects is given in Listing 3, Listing 4, Table 2, and Table 3 below.

Bookmark conservation techniques further include validating the components and properties to determine whether common bookmarks exist and whether the common bookmarks have been changed. For instance, the Save As Operation 701 calls the Validate( ) operation of the BookmarkXmlRuleEngine 703. The BookmarkXmlRuleEngine 703 performs the isCommonBookmarkEntriesExist( ) operation which calls a getName( ) of the Dictionary<BookmarkRuleImpl> class 704 for each CommonBookmarkEntry, get src( ) of the Dictionary<AppModelImpl> class 705, and get target( ) of the Dictionary<AppModelImpl> class 705. Then the BookmarkXmlRuleEngine 703 performs getRuleByComponentType( ) and a list of rules are returned from the Dictionary<BookmarkRuleImpl> class 704.

When a common bookmark exists, the BookmarkXmlRuleEngine 703 performs the getProperties( ) operation for each rule in the list of rules. The getProperties( ) operation calls getPropertyValue( ) of the Dictionary<AppModelImpl> class 705 to obtain the source value ("srcvalue") of the property and it calls the getPropertyValue( ) to obtain the target value ("targetvalue") of the property. Thus, for each property, the value of that property for the source (e.g., the document being saved) and the value of that property for the target (e.g., the document to be overwritten) are obtained. Then, the ruleProperties( ) operation determines whether the source value is equal to the target value ("srcValue==targetValue"). If these values are equal, the operation returns "true" to the Save As Operation 701. If these values are not equal ("srcValue!=targetValue"), then the operation returns "false" to the Save As Operation 701. If there are no properties to compare then "true" is returned to the Save As Operation 701.

Accordingly, the property values of the source document and the target document are compared to each other according to the rules in order to determine whether certain property values changed. If the property values did not change (i.e., they are equal), then "true" is returned. Since the properties did not change, the bookmarks associated with the target document may be usable by the source document. Accordingly, these bookmarks may be retained by including the bookmark identifier of the target document in the source document. This is advantageous because the users of the document do not need to recreate their bookmarks as discussed above.

Figure 8:
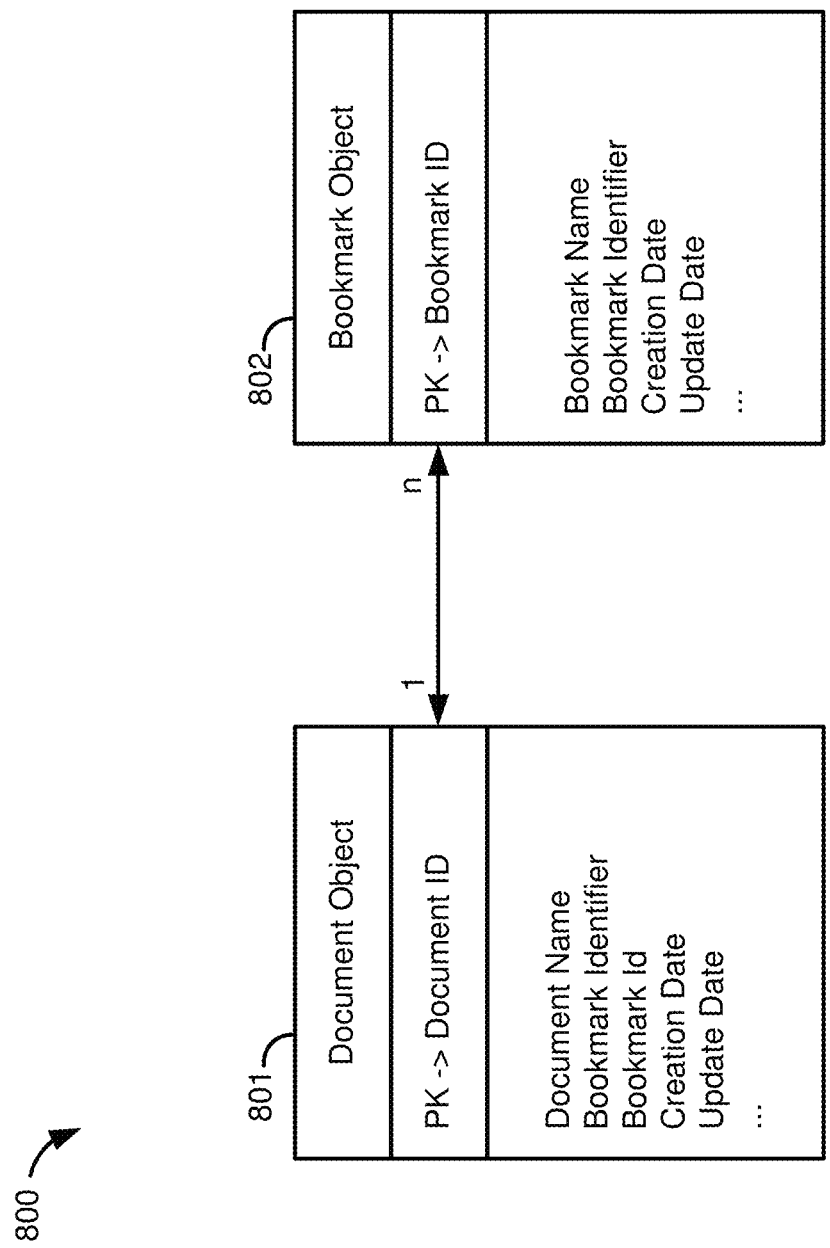
FIG. 8 shows a diagram of a document object associated with a bookmark object, according to an embodiment.

As discussed above, a document (e.g., a document data object) may be associated with a bookmark (e.g., a bookmark data object). FIG. 8 shows a diagram 800 of a document object 801 associated with a bookmark object 801, according to an embodiment. The "Document ID" id a primary key (PK) of the document object 801 that may be associated with a plurality (n) of bookmark objects 802 using the "Bookmark ID" primary keys.

The Document Object 801 includes a Document Name, a Bookmark Identifier, a Bookmark Id, a Creation Date, an Update Date, and other properties. The Bookmark Object 802 includes a Bookmark Name, a Bookmark Identifier, a Creation Date, an Update Date, and other properties.

Figure 9:
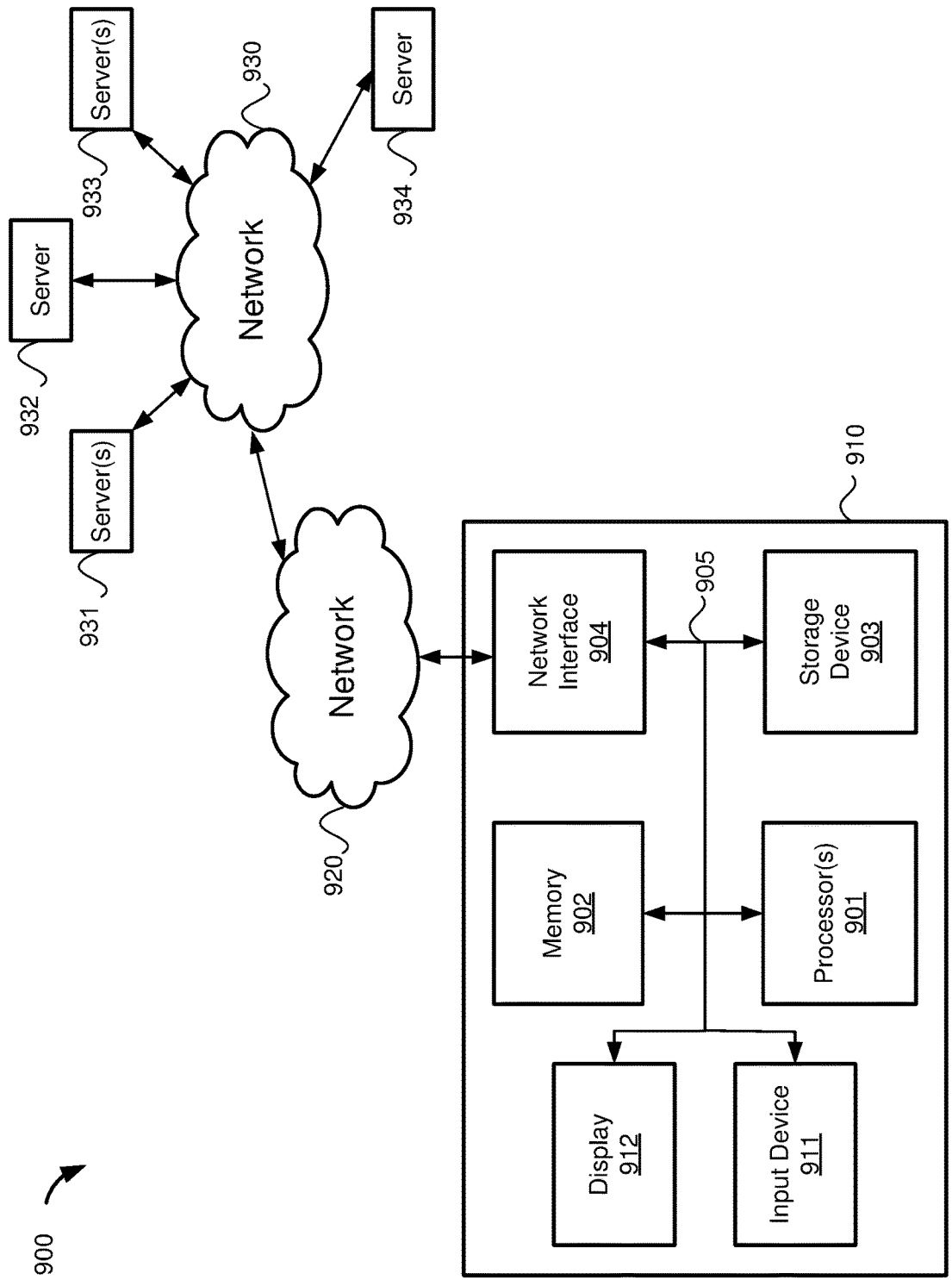
FIG. 9 shows a diagram of hardware of a special purpose computing machine for implementing systems and methods described herein.
Figure 10:
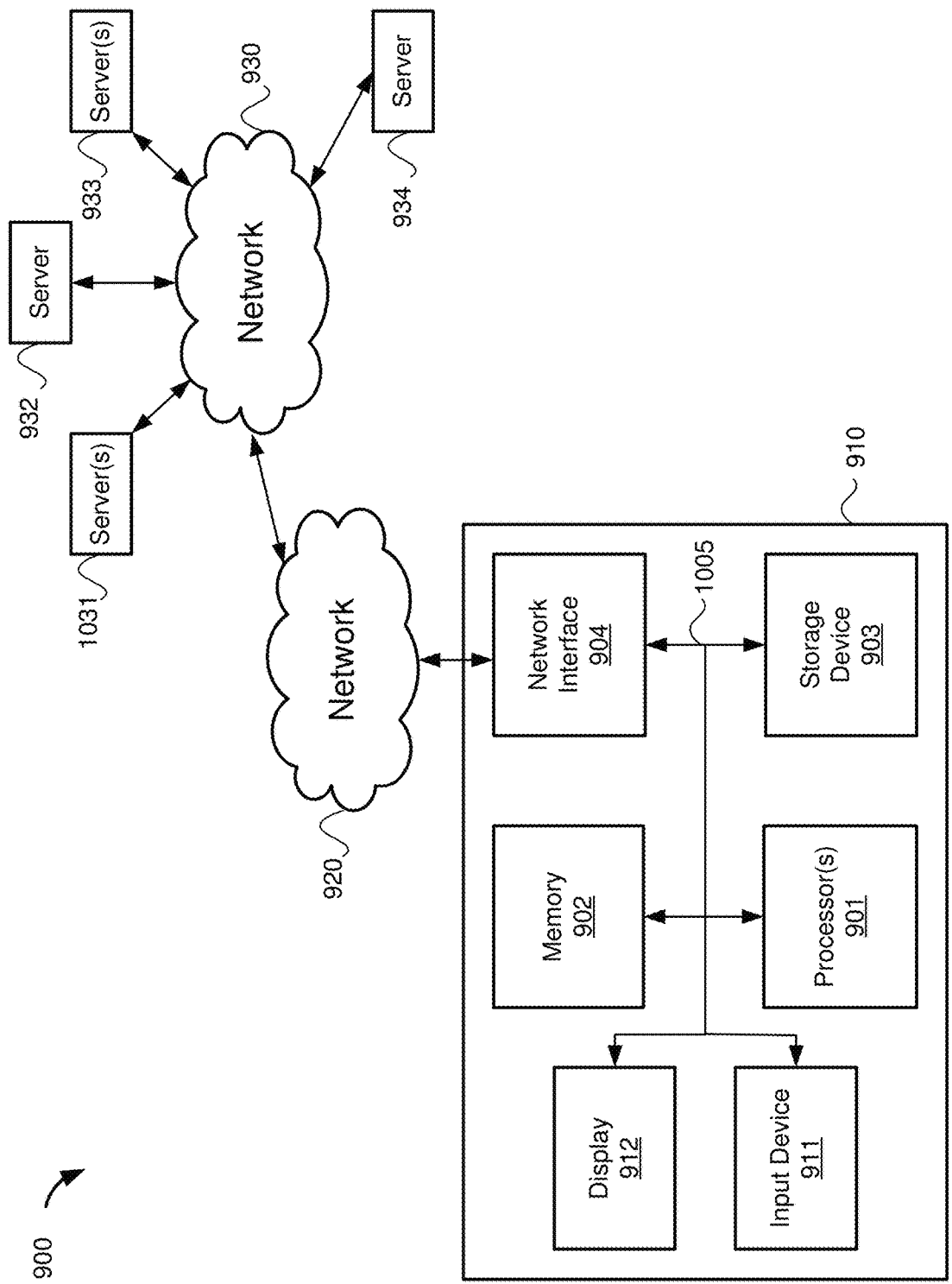

FIG. 9 shows a diagram of hardware of a special purpose computing machine for implementing the document conservation techniques described herein. The following hardware description is merely one example. It is to be understood that a variety of computers topologies may be used to implement the above described techniques. The hardware shown in FIG. 9 is specifically configured to implement the recruiter system described herein.

A computer system 910 is illustrated in FIG. 9. The computer system 910 includes a bus 905 or other communication mechanism for communicating information, and one or more processors 901 coupled with bus 905 for processing information. The computer system 910 also includes a memory 902 coupled to bus 905 for storing information and instructions to be executed by processor 901, including information and instructions for performing some of the techniques described above, for example. This memory may also be used for storing programs executed by processor(s) 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 903 may include source code, binary code, or software files for performing the techniques above, such as the processes described above, for example. Storage device and memory are both examples of non-transitory computer readable storage mediums.

The computer system 910 may be coupled via bus 905 to a display 912 for displaying information to a computer user. An input device 911 such as a keyboard, touchscreen, and/or mouse is coupled to bus 905 for communicating information and command selections from the user to processor 901. The combination of these components allows the user to communicate with the system. In some systems, bus 905 represents multiple specialized buses, for example.

The computer system also includes a network interface 904 coupled with bus 905. The network interface 904 may provide two-way data communication between computer system 910 and a network 920. The network interface 904 may be a wireless or wired connection, for example. The computer system 910 can send and receive information through the network interface 904 across a local area network, an Intranet, a cellular network, or the Internet, for example. In the Internet 930 example, a browser, for example, may access data and features on backend systems that may reside on multiple different hardware servers 931-934 across the network. The servers 931-934 may be part of a cloud computing environment, for example.

EXAMPLES

Example bookmark conservation techniques using the sequence of FIG. 7A-B are provided below. The examples involve three documents, "Doc A," "Doc B," and "Doc C" having bookmark identifiers and bookmark content as shown in Table 1 below.

TABLE 1

| Document Name | Bookmark Identifier | Bookmark content |
|---|---|---|
| Doc A | bd6aec5a-466b-404e-9235-6b3b22a17d3b | <bi:property name="BOOKMARK_ENTRIES" type="UNORDEREDLIST"> <bi:property name="BOOKMARK_ENTRY" index="0" value="DS_1"/> <bi:property name="BOOKMARK_ENTRY" index="1" value="SAMLE_TEXT_BOOKMARKED"/> <bi:property name="BOOKMARK_ENTRY" index="2" value="CROSSTAB_1"/> </bi:property> |
| Doc B | 5e4d4e9c-16cb-412e-b60b-d027df9f5b31 | <bi:property name="BOOKMARK_ENTRIES" type="UNORDEREDLIST"> <bi:property name="BOOKMARK_ENTRY" index="0" value="DS_1"/> <bi:property name="BOOKMARK_ENTRY" index="1" value="SAMLE_TEXT_BOOKMARKED"/> <bi:property name="BOOKMARK_ENTRY" index="2" value="CROSSTAB_1"/> </bi:property> |
| Doc C | 94a5dd22-3a75-4f07-9733-eba51b0040b8 | <bi:property name="BOOKMARK_ENTRIES" type="UNORDEREDLIST"> <bi:property name="BOOKMARK_ENTRY" index="0" value="DS_1"/> <bi:property name="BOOKMARK_ENTRY" index="1" value="CROSSTAB_1"/> </bi:property> |

In one example, a document named Doc A has previously been saved as Doc B and now Doc B is being saved as Doc A. In this example, the bookmark conservation techniques discussed above may be used to determine whether to retain the bookmark identifier.

The document object for Doc A may include metadata that is persistent in the file. The metadata for Doc A is shown in Listing 3 below. This metadata has been simplified for the purposes of illustrating the bookmark conservation techniques discussed herein.

Listing 3

```
<bi:biapp bi:version="2401">
  <bi:component name="APPLICATION_PROPERTIES" type="APPLICATION_PROPERTIES">
    <bi:property name="THEME" value="belize"/>
    <bi:property name="MERGE_PROMPTS" value=" "/>
    <bi:property name="UI5_MAIN" value="X"/>
    <bi:property name="COMPACT_MODE" value="X"/>
  </bi:component>
  <bi:data_source_alias name="DS_1" type="QUERY_DATA_SOURCE">
    <bi:property name="DATA_SOURCE_DEFINITION">
      <bi:property name="DATA_SOURCE_CONNECTION"
value="cuid:AUEhuwCXQIpCpNfudL7XvbA"/>
      <bi:property name="DATA_SOURCE_TYPE" type="CHOICE"
value="INFOPROVIDER"/>
      <bi:property name="DATA_SOURCE_NAME" value="0D_NW_C01"/>
    </bi:property>
  </bi:data_source_alias>
  <bi:component name="ROOT" type="ABSOLUTE_LAYOUT_COMPONENT">
    <bi:component name="SAMLE_TEXT_BOOKMARKED" type="TEXT_COMPONENT">
      <bi:property name="TEXT" value="Sample text"/>
      <bi:property name="LEFT_MARGIN" value="129"/>
      <bi:property name="TOP_MARGIN" value="67"/>
    </bi:component>
    <bi:component name="CROSSTAB_1" type="CROSSTAB_COMPONENT">
      <bi:property name="LEFT_MARGIN" value="79"/>
      <bi:property name="TOP_MARGIN" value="228"/>
      <bi:property name="DATA_SOURCE_ALIAS_REF" value="DS_1"/>
    </bi:component>
    <bi:component name="SAMPLE_TEXT" type="TEXT_COMPONENT">
      <bi:property name="TEXT" value="Sample text-non bookmarked"/>
      <bi:property name="LEFT_MARGIN" value="129"/>
      <bi:property name="TOP_MARGIN" value="124"/>
    </bi:component>
    <bi:component name="CREATEBOOKMARK" type="BUTTON_COMPONENT">
      <bi:property name="TEXT" value="Create_BOOKMARK"/>
      <bi:property name="LEFT_MARGIN" value="388"/>
      <bi:property name="TOP_MARGIN" value="59"/>
      <bi:property name="ON_CLICK">
        <bi:value><![CDATA[BOOKMARKS_1.save( );]]></bi:value>
      </bi:property>
    </bi:component>
    <bi:component name="CONTEXT_MENU" type="CONTEXT_MENU_COMPONENT"/>
    <bi:component name="BOOKMARKS_1" type="BOOKMARKS_COMPONENT">
      <bi:property name="BOOKMARK_COMPONENT_IDENTIFIER"
value="bd6aec5a-466b-404e-9235-6b3b22a17d3b"/>
      <bi:property name="BOOKMARK_ENTRIES" type="UNORDEREDLIST">
        <bi:property name="BOOKMARK_ENTRY" index="0"
value="DS_1"/>
        <bi:property name="BOOKMARK_ENTRY" index="1"
value="SAMLE_TEXT_BOOKMARKED"/>
        <bi:property name="BOOKMARK_ENTRY" index="2"
value="CROSSTAB_1"/>
      </bi:property>
    </bi:component>
  </bi:component>
</bi:biapp>
```

The metadata for Doc A in Listing 3 shows components of the document, including a text component named "SAMPLE_TEXT_BOOKMARKED" which has a type of "TEXT_COMPONENT," a cross-tab component named "CROSSTAB_1" having a type of "CROSSTAB_COMPONENT," another text component named "SAMPLE_TEXT" having a type of "TEXT_COMPONENT," and a button component named "CREATEBOOKMARK" having a type of "BUTTON_COMPONENT." Each of these components may have certain properties designated by name and value as shown in Listing 3. For instance, the component "SAMLE_TEXT_BOOKMARKED" has a "TEXT" property with a value of "Sample text," a "LEFT_MARGIN" property with a value of "129," and a "TOP_MARGIN" property with a value of "67." The metadata for Doc A also includes the bookmark component named "BOOKMARKS_1." The bookmark component of Doc A has a bookmark identifier of "bd6aec5a-466b-404e-9235-6b3b22a17d3b." The bookmark components includes bookmarks for "DS_1," "SAMPLE_TEXT_BOOKMARKED," and "CROSSTAB_1." As shown in Listing 3, not all of the components in the metadata are bookmarked.

As mentioned above, in this example, Doc A was saved as Doc B and now Doc B is being saved as Doc B. However, certain properties in Doc B may have been changed such that they are different from those in Doc A. Listing 4 below shows the "SAMPLE_TEXT_BOOKMARKED" component of Doc B.

Listing 4

```
<bi:component name="SAMLE_TEXT_BOOKMARKED" type="TEXT_COMPONENT">
    <bi:property name="TEXT" value="Sample text_New"/>
    <bi:property name="LEFT_MARGIN" value="129"/>
    <bi:property name="TOP_MARGIN" value="67"/>
    <bi:property name="WIDTH" value="180"/>
</bi:component>
```

Comparing the properties in Doc A (Listing 3) and Doc B (Listing 4) shows that the "TEXT" property of the "SAMLE_TEXT_BOOKMARKED" component has changed from "Sample text" in Doc A to "Sample text_New" in Doc B and a "WIDTH" property has been added to the "SAMLE_TEXT_BOOKMARKED" component in Doc B, which was not in Doc A. In this example, none of the other properties of the other components may have changed except that the bookmark identifier may have changed when a document is "saved as" a different document, as discussed above. In this example, the bookmark component of Doc A has an identifier of "bd6aec5a-466b-404e-9235-6b3b22a17d3b" while the bookmark component of Doc B has a different identifier of "5e4d4e9c-16cb-412e-b60b-d027df9f5b31."

In this example, the rules are those listed in Listing 1 above. As shown in Listing 1, the components that are included in the rules are "QUERY_DATA_SOURCE," "CROSSTAB_COMPONENT," "com_ip_bi_VizFrame," and "com_ip_bi_Shape." However, these components were not changed in Doc B compared to Doc A. The component that was changed in Doc B was the "SAMLE_TEXT_BOOKMARKED" component having type "TEXT_COMPONENT," which is not listed in the rules. Since the "TEXT_COMPONENT" type is not listed in the rules, then changes may be made to such components while still being able to retain the bookmarks. Therefore, when Doc B is saved back as Doc A with these changes, the bookmark identifier "bd6aec5a-466b-404e-9235-6b3b22a17d3b" of Doc A may be retained.

Referring to the sequence diagram of FIG. 7, the determination of whether to retain the bookmark identifier when Doc B is saved as Doc A may involve the following operations:

1. SetSourceAppModel(<content of DocB.txt>)
2. SetTargetAppModel(<content of DocA.txt>)
3. IsCommonBookmarksExists( )→true
4. Execute the operations in Table2 for DS1, CROSSTAB_1, SAMLE_TEXT_BOOKMARKED

TABLE 2

| Operation | Return |
|---|---|
| Entry.getName( ) | DS_1 |
| getSrc(DS_1) | <bi:data_source_alias name="DS_1" type="QUERY_DATA_SOURCE"><br>  <bi:property name="DATA_SOURCE_DEFINITION"><br>    <bi:property name="DATA_SOURCE_CONNECTION" value="cuid:AUEhuwCXQIpCpNfudL7XvbA"/><br>    <bi:property name="DATA_SOURCE_TYPE" type="CHOICE" value="INFOPROVIDER"/><br>    <bi:property name="DATA_SOURCE_NAME" value="0D_NW_C01"/><br>  </bi:property><br></bi:data_source_alias> |
| getTarget(DS_1) | <bi:data_source_alias name="DS_1" type="QUERY_DATA_SOURCE"><br>  <bi:property name="DATA_SOURCE_DEFINITION"><br>    <bi:property name="DATA_SOURCE_CONNECTION" value="cuid:AUEhuwCXQIpCpNfudL7XvbA"/><br>    <bi:property name="DATA_SOURCE_TYPE" type="CHOICE" value="INFOPROVIDER"/><br>    <bi:property name="DATA_SOURCE_NAME" value="0D_NW_C01"/><br>  </bi:property><br></bi:data_source_alias> |

TABLE 2-continued

| Operation | Return |
|---|---|
| getTarget(DS_1) | <bi:data_source_alias name="DS_1" |
| getRuleByComponentType(DS_1) | QUERY_DATA_SOURCE |
| Rule.getProperties(QUERY_DATA_SOURCE) | <component type= 'QUERY_DATA_SOURCE'> |
| | <properties> |
| | < DATA_SOURCE_CONNECTION /> |
| | < DATA_SOURCE_TYPE/> |
| | < DATA_SOURCE_NAME/> |
| | </properties> |
| | </component> |
| Iterate thru the properties ( DATA_SOURCE_CONNECTION, DATA_SOURCE_TYPE, DATA_SOURCE_NAME) | Compare the values of Column2 of Row2 and 3 of this table. |

In another example, a different document Doc C is being saved as Doc A. In this example, properties of components listed in the rules in Listing 1 have changed in Doc C compared to Doc A. In this case, the bookmark identifier of Doc A may not be retained and a new bookmark identifier may be generated and used for Doc C when it is saved as Doc A. Referring to the sequence diagram of FIG. 7, the determination of whether to retain the bookmark identifier when Doc C is saved as Doc A may involve the following operations:

1. SetSourceAppModel(<content of DocC.txt>)
2. SetTargetAppModel(<content of DocA.txt>)
3. IsCommonBookmarksExists( )→true
4. Execute the operations in Table 3 for DS1, CROSS-TAB_1

TABLE 3

| Operations | Return |
|---|---|
| Entry.getName( ) | DS_1 |
| getSrc(DS_1) | <bi:data_source_alias name="DS_1" type="QUERY_DATA_SOURCE"> |
| | <bi:property name="DATA_SOURCE_DEFINITION"> |
| | <bi:property name="DATA_SOURCE_CONNECTION" value="cuid:AUEhuwCXQIpCpNfudL7XvbA"/> |
| | <bi:property name="DATA_SOURCE_TYPE" type="CHOICE" value="INFOPROVIDER"/> |
| | <bi:property name="DATA_SOURCE_NAME" value="Z_COUNTRY"/> |
| | </bi:property> |
| | </bi:data_source_alias> |
| getTarget(DS_1) | <bi:data_source_alias name="DS_1" type="QUERY_DATA_SOURCE"> |
| | <bi:property name="DATA_SOURCE_DEFINITION"> |
| | <bi:property name="DATA_SOURCE_CONNECTION" value="cuid:AUEhuwCXQIpCpNfudL7XvbA"/> |
| | <bi:property name="DATA_SOURCE_TYPE" type="CHOICE" value="INFOPROVIDER"/> |
| | <bi:property name="DATA_SOURCE_NAME" value="0D_NW_C01"/> |
| | </bi:property> |
| | </bi:data_source_alias> |
| getRuleByComponentType(DS_1) Rule.getProperties(QUERY_DATA_SOURCE) | QUERY_DATA_SOURCE <component type= 'QUERY_DATA_SOURCE'> <properties> < DATA_SOURCE_CONNECTION /> < DATA_SOURCE_TYPE/> < DATA_SOURCE_NAME/> </properties> </component> |

TABLE 3-continued

| Operations | Return |
|---|---|
| Iterate thru the properties (DATA_SOURCE_CONNECTION, DATA_SOURCE_TYPE, DATA_SOURCE_NAME) | Compare the values of Column2 of Row2 and 3 of this table. |

As shown in Table 3 above, the QUERY_DATA_SOURCE component in Doc C is different from the QUERY_DATA_SOURCE component in Doc A. For instance, the "DATA_SOURCE_NAME" property is "Z_COUNTRY" in Doc C while that property is "0D_NW_C01" in Doc A. As shown in the rules in Listing 1, the "DATA_SOURCE_NAME" property is included in the rules. Since this property is listed in the rules and its value has changed, then the bookmark conservation service may determine that the bookmark identifier of Doc A should not be retained and a new bookmark identifier may be generated.

ADDITIONAL EMBODIMENTS

Additional embodiments of the present disclosure are further described below.

One embodiment provides a computer system comprising one or more processors and one or more machine-readable medium. The one or more machine-readable medium are coupled to the one or more processors. The one or more machine-readable medium store computer program code comprising sets of instructions executable by the one or more processors. The instructions are executable by the one or more processors to store a first document data object using a first name. The first document data object includes a first bookmark identifier associated with a first set of bookmark data objects. Each bookmark data object of the first set includes a set of properties and corresponding property values. The instructions are further executable by the one or more processors to obtain a request from a first client computer to store a second document data object using a requested name. The requested name being the same as the first name of the first document data object. The instructions are further executable by the one or more processors to determine, in response to the request, whether a stored document data object is stored using the requested name. The first document being stored using the requested name. The instructions are further executable by the one or more processors to determine, in response to the determination that the first document is stored using the requested name, whether to include the first bookmark identifier associated with the first set of bookmark data objects in the second document data object based on a set of rules identifying one or more properties of document data objects. The instructions are further executable by the one or more processors to store a modified second document data object including the first bookmark identifier based on the set of properties and corresponding property values of the first set of bookmark data objects and second properties and corresponding second property values of the second document data object satisfying the set of rules.

In some embodiments of the computer system, the computer program code further comprises sets of instructions to provide the modified second document data object including the first bookmark identifier to a second client computer, where the first set of bookmark data objects is usable by the second client computer to change visualizations of the modified second document data object.

In some embodiments of the computer system, the determination of whether to include the first bookmark identifier is based on a comparison of the set of properties and corresponding property values of the first set of bookmark data objects and second properties and corresponding second property values of the second document data object.

In some embodiments of the computer system, the set of properties and the corresponding property values indicate a particular set of data to be visualized in the first document and configurations for visualizing the particular sets of data.

In some embodiments of the computer system, the modified second document data object includes parameters for one or more queries to obtain data for one or more visualizations of the data.

In some embodiments of the computer system, the computer program code further comprises sets of instructions to obtain a second request from a second client computer to store a third document data object using a second requested name, where the second requested name is the same as a fourth name of a fourth document data object stored using the fourth name, where the fourth document data object includes a fourth bookmark identifier. In such embodiments, the computer program code may further include instructions to store the third document data object including a third bookmark identifier based on the a fourth set of properties and corresponding fourth property values of a fourth set of bookmark data objects associated with the fourth bookmark identifier and the third properties and corresponding third property values of the third document data object not satisfying a second set of rules.

In some embodiments of the computer system, the set of rules is further based on properties of custom components created for the first client computer.

Another embodiment provides one or more non-transitory computer-readable medium storing computer program code comprising sets of instructions. The computer program code comprises instructions to store a first document data object using a first name. The first document data object including a first bookmark identifier associated with a first set of bookmark data objects. Each bookmark data object of the first set including a set of properties and corresponding property values. The computer program code further comprises instructions to obtain a request from a first client computer to store a second document data object using a requested name, the requested name being the same as the first name of the first document data object. The computer program code further comprises instructions to determine, in response to the request, whether a stored document data object is stored using the requested name, the first document being stored using the requested name. The computer program code further comprises instructions to determine, in response to the determination that the first document is stored using the requested name, whether to include the first bookmark identifier associated with the first set of bookmark data objects in the second document data object based on a set of rules identifying one or more properties of document data objects. The computer program code further comprises instructions to store a modified second document data object including the first bookmark identifier based on the set of properties and corresponding property values of the first set of bookmark data objects and second properties and corresponding second property values of the second document data object satisfying the set of rules.

In some embodiments of the computer-readable medium, the computer program code further comprises sets of instructions to provide the modified second document data object including the first bookmark identifier to a second client computer, where the first set of bookmark data objects is usable by the second client computer to change visualizations of the modified second document data object.

In some embodiments of the computer-readable medium, the determination of whether to include the first bookmark identifier is based on a comparison of the set of properties and corresponding property values of the first set of bookmark data objects and second properties and corresponding second property values of the second document data object.

In some embodiments of the computer-readable medium, the set of properties and the corresponding property values indicate a particular set of data to be visualized in the first document and configurations for visualizing the particular sets of data.

In some embodiments of the computer-readable medium, the modified second document data object includes parameters for one or more queries to obtain data for one or more visualizations of the data.

In some embodiments of the computer-readable medium, the computer program code further comprises sets of instructions to obtain a second request from a second client computer to store a third document data object using a second requested name, where the second requested name is the same as a fourth name of a fourth document data object stored using the fourth name, and where the fourth document data object includes a fourth bookmark identifier. In such embodiments, the compute program code may further comprise sets of instructions to store the third document data object including a third bookmark identifier based on the a fourth set of properties and corresponding fourth property values of a fourth set of bookmark data objects associated with the fourth bookmark identifier and the third properties and corresponding third property values of the third document data object not satisfying a second set of rules.

In some embodiments of the computer-readable medium the set of rules is further based on properties of custom components created for the first client computer.

Another embodiment provides a computer-implemented method. The computer-implemented method includes storing a first document data object using a first name. The first document data object includes a first bookmark identifier associated with a first set of bookmark data objects. Each bookmark data object of the first set including a set of properties and corresponding property values. The method further includes obtaining a request from a first client computer to store a second document data object using a requested name, the requested name being the same as the first name of the first document data object. The method further includes determining, in response to the request, whether a stored document data object is stored using the requested name, the first document being stored using the requested name. The method further includes determining, in response to the determination that the first document is stored using the requested name, whether to include the first bookmark identifier associated with the first set of bookmark data objects in the second document data object based on a set of rules identifying one or more properties of document data objects. The method further includes storing a modified second document data object including the first bookmark identifier based on the set of properties and corresponding property values of the first set of bookmark data objects and second properties and corresponding second property values of the second document data object satisfying the set of rules.

In some embodiments of the computer-implemented method, the method further comprises providing the modified second document data object including the first bookmark identifier to a second client computer, where the first set of bookmark data objects are usable by the second client computer to change visualizations of the modified second document data object.

In some embodiments of the computer-implemented method, the determination of whether to include the first bookmark identifier is based on a comparison of the set of properties and corresponding property values of the first set of bookmark data objects and second properties and corresponding second property values of the second document data object.

In some embodiments of the computer-implemented method, the set of properties and the corresponding property values indicate a particular set of data to be visualized in the first document and configurations for visualizing the particular sets of data.

In some embodiments of the computer-implemented method, the modified second document data object includes parameters for one or more queries to obtain data for one or more visualizations of the data.

In some embodiments of the computer-implemented method, the method further comprises obtaining a second request from a second client computer to store a third document data object using a second requested name, where the second requested name is the same as a fourth name of a fourth document data object stored using the fourth name, and where the fourth document data object includes a fourth bookmark identifier. In such embodiments, the method may further comprise storing the third document data object including a third bookmark identifier based on the a fourth set of properties and corresponding fourth property values of a fourth set of bookmark data objects associated with the fourth bookmark identifier and the third properties and corresponding third property values of the third document data object not satisfying a second set of rules.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:
1. A computer system, comprising:
one or more processors; and
one or more machine-readable medium coupled to the one or more processors and storing computer program code comprising sets of instructions executable by the one or more processors to:
store a first document data object using a first name, the first document data object including a first bookmark identifier associated with a first set of bookmark data objects, each bookmark data object of the first set including a first set of properties and corresponding property values;

store a second document data object using a second name, the second document data object being sourced from the first document data object and including a second bookmark identifier associated with a second set of bookmark data objects, each bookmark data object of the second set including a second set of properties and corresponding property values;

obtain a request from a first client computer to store a third document data object, having third document data, using a requested name, the requested name being the same as the first name of the first document data object, wherein the third document data object is sourced from the second document data object and including a third bookmark identifier associated with a third set of bookmark data objects, each bookmark data object of the third set including a third set of properties and corresponding property values;

determine, in response to the request, whether a stored document data object is stored using the requested name, the first document being stored using the requested name;

determine, in response to the determination that the first document data object is stored using the requested name, whether to include the first bookmark identifier associated with the first set of bookmark data objects in the third document data object based on a set of rules identifying one or more properties of document data objects preventing the first bookmark identifier from returning a blank result set when associated with the third document data object, wherein the determination of whether to include the first bookmark identifier is based on a comparison of the first set of properties and corresponding property values of the first set of bookmark data objects and third properties and corresponding third property values of the third document data object to identify one or more third properties changed compared to the first properties; and store a modified third document data object including the first bookmark identifier based on the first set of properties and corresponding property values of the first set of bookmark data objects and the third properties and corresponding third property values of the third document data object satisfying the set of rules.

2. The computer system of claim 1, wherein the computer program code further comprises sets of instructions executable by the one or more processors to:

provide the modified third document data object including the first bookmark identifier to a second client computer, the first set of bookmark data objects usable by the second client computer to change visualizations of the modified third document data object.

3. The computer system of claim 1, wherein the set of properties and the corresponding property values indicate a particular set of data to be visualized in the first document and configurations for visualizing the particular sets of data.

4. The computer system of claim 1, wherein the modified third document data object includes parameters for one or more queries to obtain data for one or more visualizations of the data.

5. The computer system of claim 1, wherein the computer program code further comprises sets of instructions executable by the one or more processors to:

obtain a second request from a second client computer to store a fourth document data object using a second requested name, the second requested name being the same as a fifth name of a fifth document data object stored using the fifth name, the fifth document data object including a fifth bookmark identifier; and store the fourth document data object including a fourth bookmark identifier based on a fifth set of properties and corresponding fifth property values of a fifth set of bookmark data objects associated with the fifth bookmark identifier and the fourth properties and corresponding fourth property values of the fourth document data object not satisfying a second set of rules.

6. The computer system of claim 1, wherein the set of rules is further based on properties of custom components created for the first client computer.

7. The computer system of claim 1, wherein the first set of properties are properties of components used by the first document data object and the second set of properties are properties of components used by the second document data object and the third set of properties are properties of components used by the third document data object.

8. One or more non-transitory computer-readable media storing computer program code comprising sets of instructions to:

store a first document data object using a first name, the first document data object including a first bookmark identifier associated with a first set of bookmark data objects, each bookmark data object of the first set including a set of properties and corresponding property values;

store a second document data object using a second name, the second document data object being sourced from the first document data object and including a second bookmark identifier associated with a second set of bookmark data objects, each bookmark data object of the second set including a second set of properties and corresponding property values;

obtain a request from a first client computer to store a third document data object using a requested name, the requested name being the same as the first name of the first document data object, wherein the third document data object is sourced from the second document data object and including a third bookmark identifier associated with a third set of bookmark data objects, each bookmark data object of the third set including a third set of properties and corresponding property values;

determine, in response to the request, whether a stored document data object is stored using the requested name, the first document being stored using the requested name;

determine, in response to the determination that the first document data object is stored using the requested name, whether to include the first bookmark identifier associated with the first set of bookmark data objects in the third document data object based on a set of rules identifying one or more properties of document data objects preventing the first bookmark identifier from returning a blank result set when associated with the third document data object, wherein the determination of whether to include the first bookmark identifier is based on a comparison of the first set of properties and corresponding property values of the first set of bookmark data objects and second properties and corresponding third property values of the second document data object to identify one or more second properties changed compared to the first properties; and store a modified third document data object including the first bookmark identifier based on the set of properties and corresponding property values of the first set of bookmark data objects and third properties and corresponding third property values of the third document data object satisfying the set of rules.

9. The non-transitory computer-readable media of claim 8, wherein the computer program code further comprises sets of instructions to:

provide the modified third document data object including the first bookmark identifier to a second client computer, the first set of bookmark data objects usable by the second client computer to change visualizations of the modified third document data object.

10. The non-transitory computer-readable media of claim 8, wherein the set of properties and the corresponding property values indicate a particular set of data to be visualized in the first document and configurations for visualizing the particular sets of data.

11. The non-transitory computer-readable media of claim 8, wherein the modified third document data object includes parameters for one or more queries to obtain data for one or more visualizations of the data.

12. The non-transitory computer-readable media of claim 8, wherein the computer program code further comprises sets of to:

obtain a second request from a second client computer to store a fourth document data object using a second requested name, the second requested name being the same as a fifth name of a fifth document data object stored using the fifth name, the fifth document data object including a fifth bookmark identifier; and store the fourth document data object including a fourth bookmark identifier based on a fifth set of properties and corresponding fifth property values of a fifth set of bookmark data objects associated with the fifth bookmark identifier and the fourth properties and corresponding fourth property values of the fourth document data object not satisfying a second set of rules.

13. The non-transitory computer-readable media of claim 8, wherein the set of rules is further based on properties of custom components created for the first client computer.

14. The non-transitory computer-readable media of claim 8, wherein the first set of properties are properties of components used by the first document data object and the second set of properties are properties of components used by the second document data object and the third set of properties are properties of components used by the third document data object.

15. A computer-implemented method, comprising:

storing a first document data object using a first name, the first document data object including a first bookmark identifier associated with a first set of bookmark data objects, each bookmark data object of the first set including a set of properties and corresponding property values;

storing a second document data object using a second name, the second document data object being sourced from the first document data object and including a second bookmark identifier associated with a second set of bookmark data objects, each bookmark data object of the second set including a second set of properties and corresponding property values;

obtaining a request from a first client computer to store a third document data object using a requested name, the requested name being the same as the first name of the first document data object, wherein the third document data object is sourced from the second document data object and including a third bookmark identifier associated with a third set of bookmark data objects, each bookmark data object of the third set including a third set of properties and corresponding property values;

determining, in response to the request, whether a stored document data object is stored using the requested name, the first document being stored using the requested name;

determining, in response to the determination that the first document data object is stored using the requested name, whether to include the first bookmark identifier associated with the first set of bookmark data objects in the third document data object based on a set of rules identifying one or more properties of document data objects preventing the first bookmark identifier from returning a blank result set when associated with the third document data object, wherein the determination of whether to include the first bookmark identifier is based on a comparison of the first set of properties and corresponding property values of the first set of bookmark data objects and third properties and corresponding second property values of the third document data object to identify one or more third properties changed compared to the first properties; and storing a modified third document data object including the first bookmark identifier based on the set of properties and corresponding property values of the first set of bookmark data objects and third properties and corresponding third property values of the third document data object satisfying the set of rules.

16. The computer-implemented method of claim 15, further comprising:

providing the modified third document data object including the first bookmark identifier to a second client computer, the first set of bookmark data objects usable by the second client computer to change visualizations of the modified third document data object.

17. The computer-implemented method of claim 15, wherein the set of properties and the corresponding property values indicate a particular set of data to be visualized in the first document and configurations for visualizing the particular sets of data.

18. The computer-implemented method of claim 15, wherein the modified third document data object includes parameters for one or more queries to obtain data for one or more visualizations of the data.

19. The computer-implemented method of claim 15, further comprising:

obtaining a second request from a second client computer to store a fourth document data object using a second requested name, the second requested name being the same as a fifth name of a fifth document data object stored using the fifth name, the fifth document data object including a fifth bookmark identifier; and storing the fourth document data object including a fourth bookmark identifier based on a fifth set of properties and corresponding fifth property values of a fifth set of bookmark data objects associated with the fifth bookmark identifier and the fourth properties and corresponding fourth property values of the fourth document data object not satisfying a second set of rules.

20. The computer-implemented method of claim 15, wherein the first set of properties are properties of components used by the first document data object and the second set of properties are properties of components used by the second document data object and the third set of properties are properties of components used by the third document data object.

* * * * *